US011235829B2

(12) United States Patent
Robillard et al.

(10) Patent No.: US 11,235,829 B2
(45) Date of Patent: Feb. 1, 2022

(54) LOCKING DEVICE FOR AN ANCHOR FOR CONNECTING AN ACCESSORY TO A VEHICLE

(71) Applicant: BOMBARDIER RECREATIONAL PRODUCTS INC., Valcourt (CA)

(72) Inventors: Pierre-Luc Robillard, Sherbrooke (CA); Christian Labbe, Sherbrooke (CA); Jonathan Asselin, Magog (CA); Michel Bourassa, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 17/187,037

(22) Filed: Feb. 26, 2021

(65) Prior Publication Data
US 2021/0269112 A1    Sep. 2, 2021

Related U.S. Application Data

(60) Provisional application No. 62/983,176, filed on Feb. 28, 2020.

(51) Int. Cl.
*B62J 7/08*    (2006.01)
(52) U.S. Cl.
CPC ..................... *B62J 7/08* (2013.01)
(58) Field of Classification Search
CPC ......... B60P 7/08; B60P 7/0807; B60P 7/0815; B60P 7/132; F16B 21/02; F16B 37/045; Y10T 403/7009; Y10T 403/7011
USPC .............................. 410/82, 84; 403/323, 343
See application file for complete search history.

(56) References Cited

U.S. PATENT DOCUMENTS

| | | | | |
|---|---|---|---|---|
| 5,160,224 | A * | 11/1992 | Schwiebert | B60P 1/6409 24/287 |
| 8,777,531 | B2 | 7/2014 | Massicotte et al. | |
| 8,875,830 | B2 | 11/2014 | Massicotte et al. | |
| 9,751,592 | B2 | 9/2017 | Labbe et al. | |
| 10,493,895 | B2 * | 12/2019 | Lamoureux | B60P 7/0815 |
| 10,900,607 | B1 * | 1/2021 | Newman | F16M 13/022 |
| 11,085,579 | B2 * | 8/2021 | Carnevali | F16M 13/022 |
| 2011/0315731 | A1 * | 12/2011 | Takemura | B60P 7/0815 224/567 |

(Continued)

FOREIGN PATENT DOCUMENTS

| | | |
|---|---|---|
| WO | 2012002959 A1 | 1/2012 |
| WO | 2021014336 A1 | 1/2021 |

*Primary Examiner* — Corey N Skurdal
(74) *Attorney, Agent, or Firm* — BCF LLP

(57) ABSTRACT

A locking device for an anchor configured to connect an accessory to a vehicle. An anchor lever is pivotable for opening and closing the anchor. The locking device includes a lock body defining a fastener aperture receiving therethrough an anchor fastener portion that is rotatable by moving the anchor lever between open and closed positions. A lock lever is pivotable relative to the locked body between locked and unlocked positions. In the unlocked position, the lock lever permits free movement of the anchor lever. In the locked position, the lock lever prevents the anchor lever from being moved from the closed position to the open position. A key post is movably connected to the lock body. The key post is movable by a key from an unsecured position to a secured position. The lock lever is fixed in the locked position when the key post is in the secured position.

20 Claims, 21 Drawing Sheets

(56) References Cited

U.S. PATENT DOCUMENTS

2012/0045276 A1* 2/2012 Carnevali ................ F16B 7/20
403/350

* cited by examiner

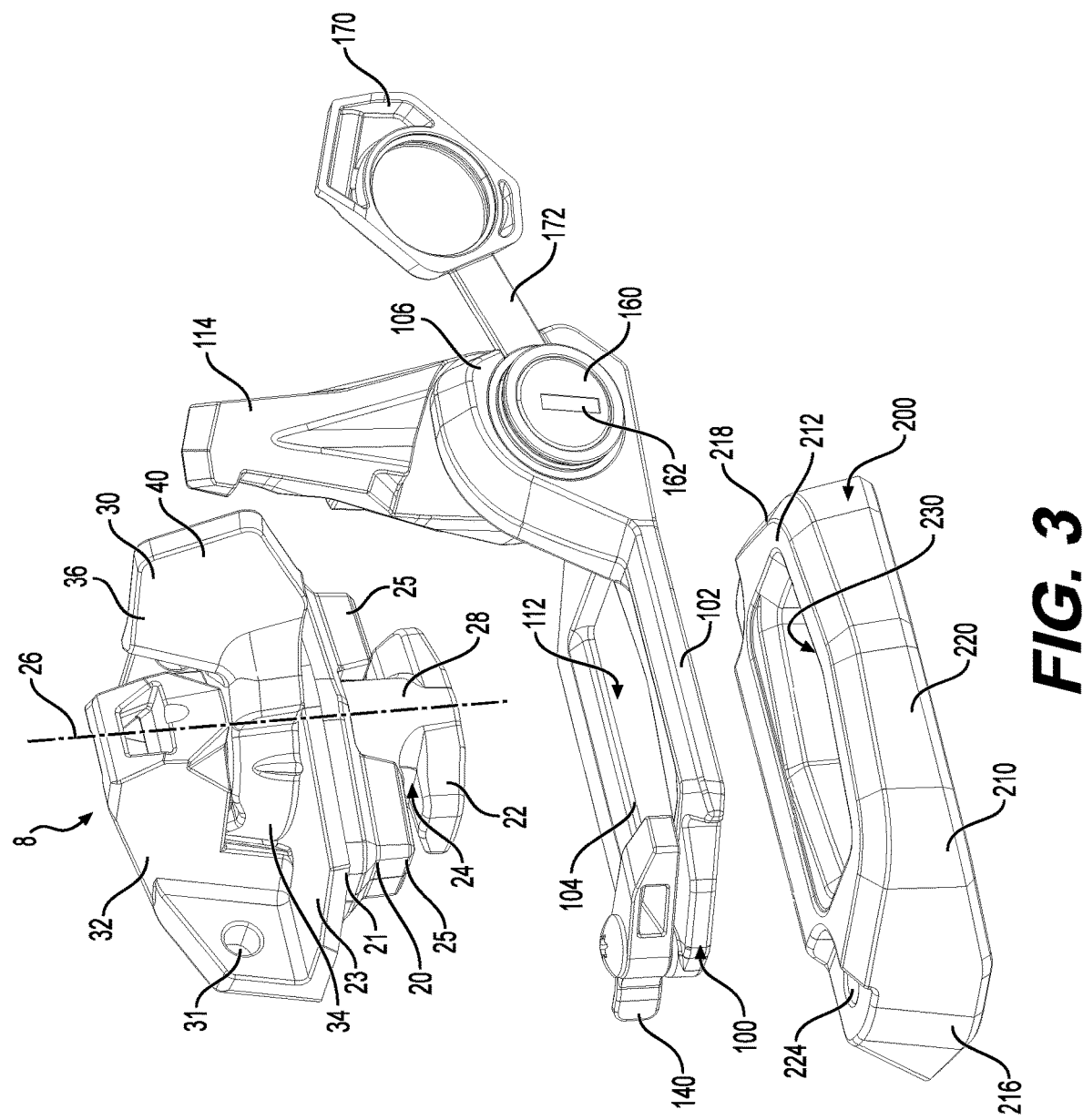

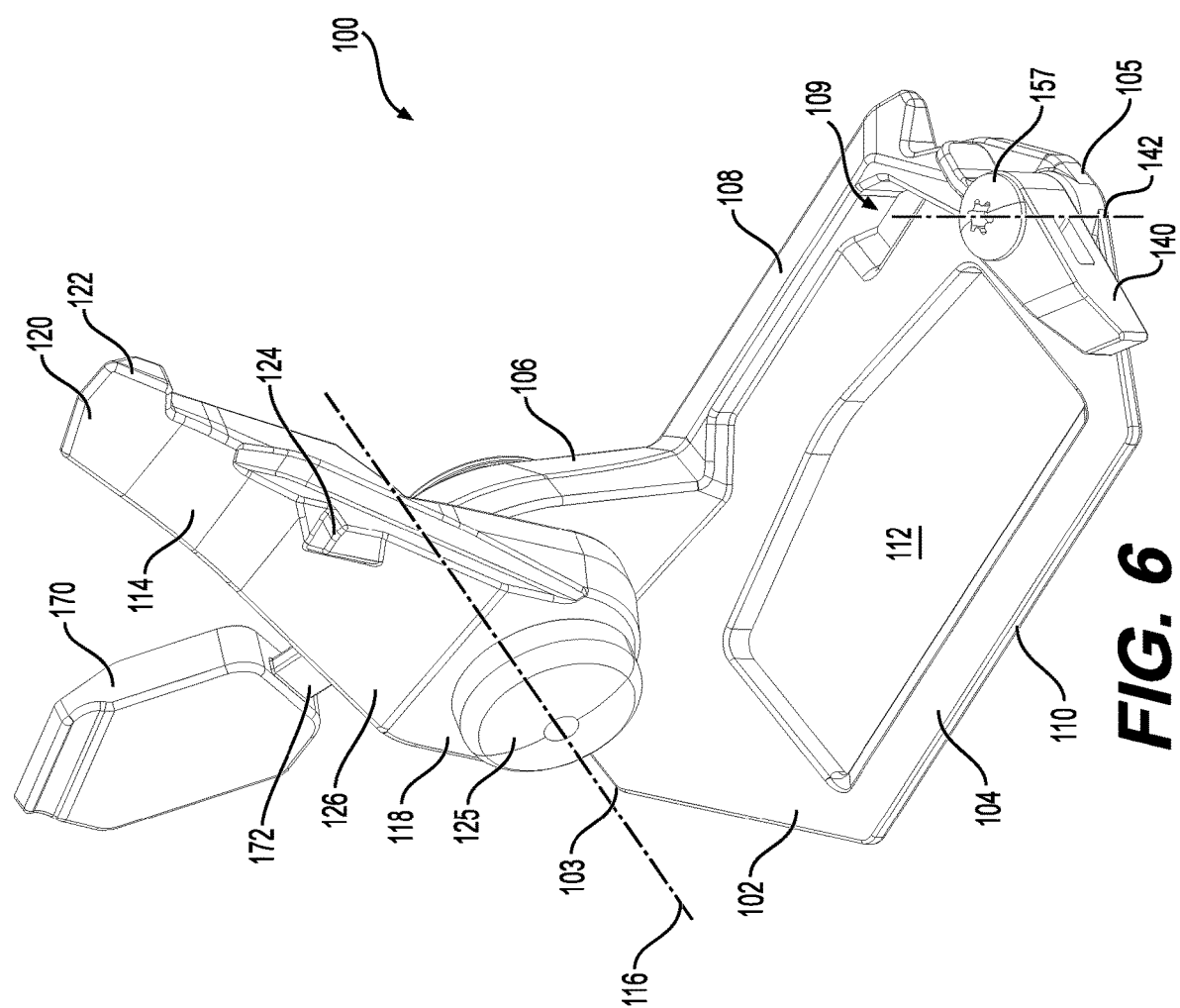

LOCKING DEVICE FOR AN ANCHOR FOR CONNECTING AN ACCESSORY TO A VEHICLE

CROSS-REFERENCE

The present application claims priority from U.S. Provisional Patent Application No. 62/983,176, filed Feb. 28, 2020, the entirety of which is incorporated herein by reference.

TECHNICAL FIELD

The present relates to anchors configured to connect an accessory to a vehicle, and particularly to locking devices therefor.

BACKGROUND

Snowmobile drivers often like to fasten different types of accessories to their snowmobiles. For instance, during long excursions, a portable fuel caddy (also referred to as a "jerry can") containing fuel can be useful to bring along and is thus fastened to the snowmobile. Other types of accessories may also be desirable including for example a storage bin for providing the snowmobile with additional storage.

Fastening mechanisms for fastening accessories to a snowmobile are known. However, some security concerns can arise as it is often possible for a person other than the driver to operate the fastening mechanism and thereby remove the accessory unbeknownst to the driver.

Therefore, there is a need for a solution that addresses at least some of these drawbacks.

SUMMARY

It is an object of the present technology to ameliorate at least some of the inconveniences present in the prior art.

According to an aspect of the present technology, there is provided a locking device for an anchor configured to connect an accessory to a vehicle. The anchor has an anchor lever pivotable from an open position to a closed position for opening and closing the anchor respectively. The locking device includes: a lock body defining a fastener aperture configured to receive therethrough a fastener portion of the anchor, the fastener portion of the anchor being rotatable by moving the anchor lever between the open position and the closed position; and a lock lever pivotably connected to the lock body, the lock lever being pivotable relative to the lock body between a locked position and an unlocked position. When the fastener portion of the anchor is received through the fastener aperture of the lock body: in the unlocked position, the lock lever permits free movement of the anchor lever between the open position and the closed position; and in the locked position, the lock lever prevents the anchor lever from being moved from the closed position to the open position. The locking device also includes a key post movably connected to the lock body, the key post defining a key aperture for receiving a key. The key post is movable by the key from an unsecured position to a secured position. The lock lever is fixed in the locked position when the key post is in the secured position.

In some embodiments, the key post is operatively connected to the lock lever; the lock lever is pivoted to the locked position by the key post when the key post is moved to the secured position; and the lock lever is pivoted to the unlocked position by the key post when the key post is moved to the unsecured position.

In some embodiments, the fastener aperture defined by the lock body has a generally pentagonal shape.

In some embodiments, the locking device also includes a retaining member movably connected to the lock body, the retaining member being movable relative to the lock body between a retaining position and a free position. In the retaining position, the retaining member prevents the anchor from being disengaged from the locking device. In the free position, the retaining member permits the anchor to be disengaged from the locking device.

In some embodiments, the retaining member is pivotably connected to the lock body, the retaining member being pivotable between the retaining position and the free position.

In some embodiments, the lock lever is pivotable about a first pivot axis; the retaining member is pivotable about a second pivot axis; and the first pivot axis is generally perpendicular to the second pivot axis.

In some embodiments, the lock body includes: a first portion defining the fastener aperture, the first portion being generally planar; and a second portion extending generally perpendicular to the first portion, the lock lever being pivotably connected to the second portion about an axis extending generally parallel to the first portion.

In some embodiments, the first portion of the lock body defines a lever aperture; the lock lever has a base and a tip opposite the base, the base being pivotably connected to the lock body; and the lock lever is shaped such that a portion thereof is received in the lever aperture of the first portion of the lock body when the lock lever is in the locked position.

In some embodiments, the lock lever has an inner surface and an outer surface opposite the inner surface, the inner surface facing toward the fastener aperture when the lock lever is in the locked position; and the lock lever has a locking projection extending from the inner surface, the locking projection being configured to abut a portion of the anchor lever of the anchor when the anchor lever is in the closed position so as to prevent the anchor lever from being moved from the closed position.

In some embodiments, the lock lever is pivotable about a first pivot axis; the anchor lever is pivotable about a second pivot axis; and the first pivot axis is configured to be generally perpendicular to the second pivot axis.

According to another aspect of the present technology, there is provided an anchor assembly for use with an anchor fixture. The anchor assembly includes: an anchor base; a fastener portion pivotably connected to the anchor base and spaced therefrom, the fastener portion being pivotable relative to the anchor base between an unfastened position and a fastened position, the fastener portion being configured to be inserted into an aperture defined by the anchor fixture; an anchor lever pivotably connected to the anchor base, the anchor lever being operatively connected to the fastener portion, the anchor lever being pivotable between an open position and a closed position for pivoting the fastener portion between the unfastened and fastened positions respectively; a lock body connected to the anchor base; a lock lever pivotably connected to the lock body, the lock lever being pivotable relative to the lock body between a locked position and an unlocked position, wherein: in the unlocked position, the lock lever permits free movement of the anchor lever between the open position and the closed position; and in the locked position, the lock lever prevents the anchor lever from being moved from the closed position to the open position; and a key post movably connected to the lock body, the key post defining a key aperture for receiving a key, the key post being movable by the key from an unsecured position to a secured position, the lock lever being fixed in the locked position when the key post is in the secured position.

In some embodiments, the key post is operatively connected to the lock lever; the lock lever is pivoted to the locked position by the key post when the key post is moved to the secured position; and the lock lever is pivoted to the unlocked position by the key post when the key post is moved to the unsecured position.

In some embodiments, the anchor assembly also includes a retaining member movably connected to the lock body, the retaining member being movable relative to the lock body between a retaining position and a free position, wherein: in the retaining position, the retaining member connects the lock body to the anchor base; and in the free position, the retaining member permits the anchor base to be disconnected from the lock body.

In some embodiments, the retaining member is pivotably connected to the lock body, the retaining member being pivotable between the retaining position and the free position.

In some embodiments, the lock lever is pivotable about a first pivot axis; the retaining member is pivotable about a second pivot axis; and the first pivot axis is generally perpendicular to the second pivot axis.

In some embodiments, the lock body defines a fastener aperture configured to receive therethrough the fastener portion of the anchor.

In some embodiments, the fastener aperture has a generally pentagonal shape.

In some embodiments, the lock body includes: a first portion defining the fastener aperture, the first portion being generally planar; and a second portion extending generally perpendicular to the first portion, the lock lever being pivotably connected to the second portion about an axis extending generally parallel to the first portion.

In some embodiments, the first portion of the lock body defines a lever aperture; the lock lever has a base and a tip opposite the base, the base being pivotably connected to the lock body; and the tip is shaped such that a portion thereof is received in the lever aperture of the first portion of the lock body when the lock lever is in the locked position.

In some embodiments, the lock lever has an inner surface and an outer surface opposite the inner surface, the inner surface facing toward the fastener aperture when the lock lever is in the locked position; and the lock lever includes a locking projection extending from the inner surface, the locking projection abutting a portion of the anchor lever of the anchor when the anchor lever is in the closed position so as to prevent the anchor lever from being moved from the closed position.

In some embodiments, the lock lever is pivotable about a first pivot axis; the anchor lever is pivotable about a second pivot axis; and the first pivot axis is generally perpendicular to the second pivot axis.

In some embodiments, the anchor lever is pivotable about an axis that extends through the fastener aperture of the lock body.

In some embodiments, when the anchor lever is in the closed position and the lock lever is in the locked position, the anchor lever and the lock lever extend in a same direction from their respective pivot axes.

In some embodiments, when the anchor lever is in the closed position and the lock lever is in the locked position, the anchor lever is disposed between the anchor base and the lock lever.

In some embodiments, the anchor lever includes a lever base and a lever handle extending from the lever base, the lever handle being configured to be operated by a user to pivot the anchor lever; the lever handle has a first end and a second end, the first end being nearer to the lever base than the second end; and when the anchor lever is in the closed position and the lock lever is in the locked position, the locking projection of the lock lever abuts the first end of the anchor lever so as to prevent the anchor lever from being moved from the closed position.

According to another aspect of the present technology, there is provided a system for securing an accessory to a vehicle. The system includes an anchor fixture configured to be connected to the vehicle, the anchor fixture having a fixture body defining an anchor aperture. The system also includes an anchor configured to be connected to an accessory, the anchor being fastenable to the anchor fixture. The anchor includes an anchor base and a fastener portion pivotably connected to the anchor base and spaced therefrom. The fastener portion is insertable through the fastener aperture of the anchor fixture. The fastener portion is pivotable relative to the anchor base between an unfastened position and a fastened position. In the unfastened position, when the fastener portion has been inserted through the fastener aperture of the anchor fixture, the fastener portion is oriented to be removed through the fastener aperture of the anchor fixture. In the fastened position, when the fastener portion has been inserted through the fastener aperture of the anchor fixture, the fastener portion is oriented to prevent its removal through the fastener aperture of the anchor fixture. The anchor also includes an anchor lever pivotably connected to the anchor base. The anchor lever is operatively connected to the fastener portion of the anchor. The anchor lever is pivotable between an open position and a closed position for pivoting the fastener portion between the unfastened and fastened positions respectively. The system also includes a locking device for locking the anchor to the anchor fixture. The locking device includes: a lock body being disposed at least partly between the anchor and the anchor fixture when the anchor is fastened to the anchor fixture, the lock body defining a fastener aperture for receiving therethrough the fastener portion of the anchor, the fastener aperture of the locking device being generally aligned with the fastener aperture of the anchor fixture when the system is in use; and a lock lever pivotably connected to the lock body, the lock lever being pivotable relative to the lock body between a locked position and an unlocked position. When the fastener portion of the anchor is received through the fastener aperture of the lock body: in the unlocked position, the lock lever permits free movement of the anchor lever between the open position and the closed position; and in the locked position, the lock lever prevents the anchor lever from being moved from the closed position to the open position. The locking device also includes a key post movably connected to the lock body. The key post defines a key aperture for receiving a key. The key post is movable by the key from an unsecured position to a secured position. The lock lever is fixed in the locked position when the key post is in the secured position.

In some embodiments, the key post is operatively connected to the lock lever; the lock lever is pivoted to the locked position by the key post when the key post is moved to the secured position; and the lock lever is pivoted to the unlocked position by the key post when the key post is moved to the unsecured position.

In some embodiments, the fastener aperture defined by the lock body has a generally pentagonal shape.

In some embodiments, the locking device also includes a retaining member movably connected to the lock body, the retaining member being movable relative to the lock body between a retaining position and a free position. In the retaining position, the retaining member prevents the anchor from being disengaged from the locking device. In the free position, the retaining member permits the anchor to be disengaged from the locking device.

In some embodiments, the retaining member is pivotably connected to the lock body, the retaining member being pivotable between the retaining position and the free position.

In some embodiments, the lock lever is pivotable about a first pivot axis; the retaining member is pivotable about a second pivot axis; and the first pivot axis is generally perpendicular to the second pivot axis.

In some embodiments, the lock body includes: a first portion defining the fastener aperture, the first portion being generally planar; and a second portion extending generally perpendicular to the first portion, the lock lever being pivotably connected to the second portion about an axis extending generally parallel to the first portion.

In some embodiments, the first portion of the lock body defines a lever aperture; the lock lever has a base and a tip opposite the base, the base being pivotably connected to the lock body; and the tip is shaped such that a portion thereof is received in the lever aperture of the first portion of the lock body when the lock lever is in the locked position.

In some embodiments, the lock lever has an inner surface and an outer surface opposite the inner surface, the inner surface facing toward the fastener aperture of the lock body when the lock lever is in the locked position; and the lock lever includes a locking projection extending from the inner surface, the locking projection abutting a portion of the anchor lever of the anchor when the anchor lever is in the closed position so as to prevent the anchor lever from being moved from the closed position.

In some embodiments, the anchor lever includes a lever base and a lever handle extending from the lever base, the lever handle being configured to be operated by a user to pivot the anchor lever; the lever handle has a first end and a second end, the first end being nearer to the lever base than the second end; and when the anchor lever is in the closed position and the lock lever is in the locked position, the locking projection of the lock lever abuts the first end of the anchor lever of the anchor so as to prevent the anchor lever from being moved from the closed position.

In some embodiments, the lock lever is pivotable about a first pivot axis; the anchor lever is pivotable about a second pivot axis; and the first pivot axis is generally perpendicular to the second pivot axis.

In some embodiments, the anchor lever is pivotable about an axis that extends through the fastener aperture of the lock body.

In some embodiments, when the anchor lever is in the closed position and the lock lever is in the locked position, the anchor lever and the lock lever extend in a same direction from their respective pivot axes.

In some embodiments, when the anchor lever is in the closed position and the lock lever is in the locked position, the anchor lever is disposed between the anchor base and the lock lever.

In some embodiments, the fastener aperture defined by the fixture body of the anchor fixture is generally hexagonal.

In some embodiments, the fixture body of the anchor fixture has a base and a top portion opposite the base; the base of the fixture body is configured to face a portion of the vehicle to which the fixture body is to be connected; and the top portion of the fixture body defines the anchor aperture of the fixture body.

In some embodiments, the fixture body has a surface on a side generally perpendicular to the top portion of the fixture body; and the fixture body at least partly defines a fastening aperture configured to receive a tongue fastener therein for securing an other accessory to the vehicle.

For purposes of this application, terms related to spatial orientation when referring to the vehicle orientation such as forwardly, rearwardly, left, and right are as they would normally be understood by a driver of the vehicle sitting thereon in a normal riding position.

Embodiments of the present each have at least one of the above-mentioned aspects, but do not necessarily have all of them.

It is to be understood that if there are any discrepancies between definitions in the present application and in documents incorporated by reference herein, definitions in the present application take precedence.

Additional and/or alternative features, aspects, and advantages of embodiments of the present will become apparent from the following description, the accompanying drawings, and the appended claims.

BRIEF DESCRIPTION OF THE DRAWINGS

For a better understanding of the present, as well as other aspects and further features thereof, reference is made to the following description which is to be used in conjunction with the accompanying drawings, where:

FIG. 3 is an exploded view of the anchoring system of FIG. 2A, including the anchor, the anchor fixture and a locking device;

FIG. 6 is a perspective view, taken from a rear, right side, of the locking device of FIG. 3, showing a lock lever thereof in an unlocked position;

DETAILED DESCRIPTION

Figure 1:
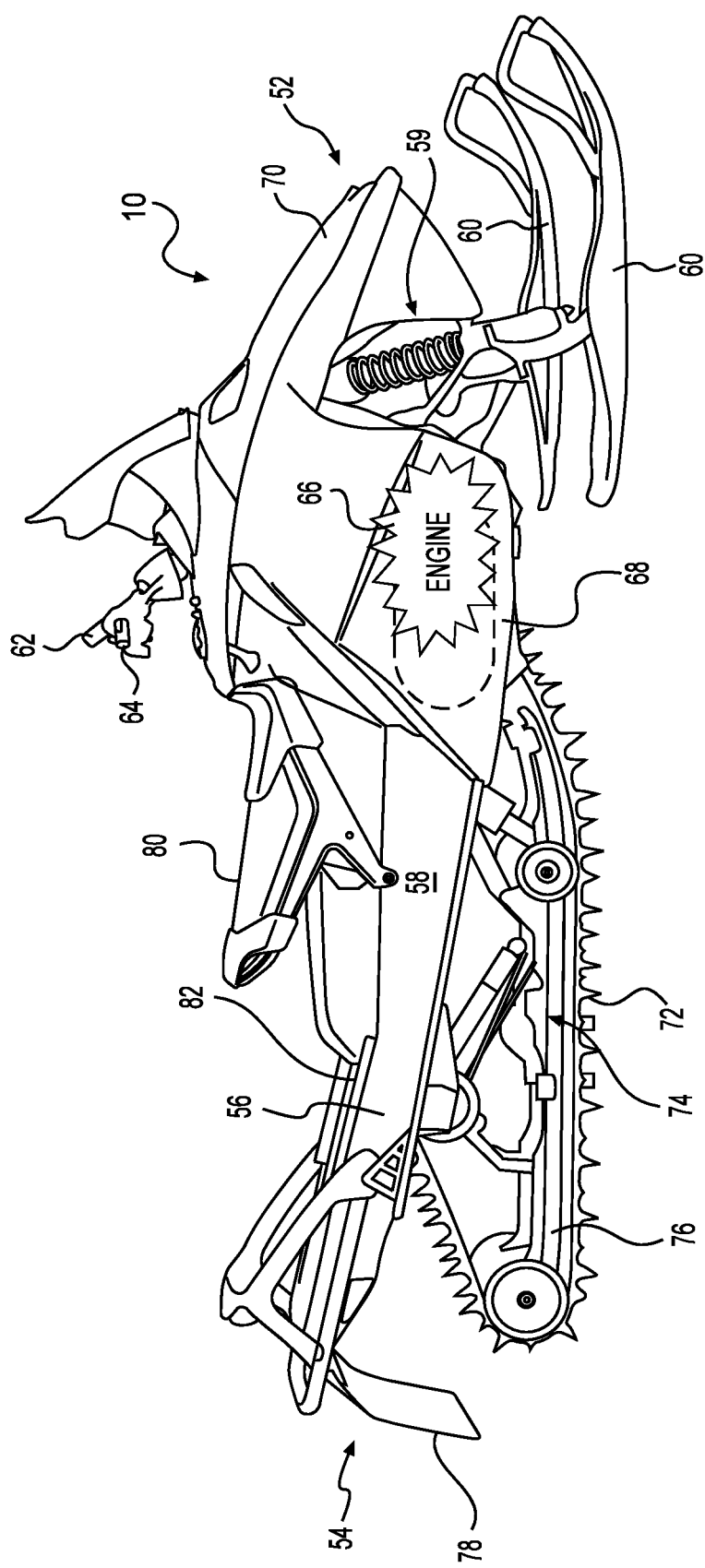
FIG. 1 is a right side elevation view of a snowmobile.

With reference to FIG. 1, a vehicle 10 will be described briefly herein. In this embodiment, the vehicle 10 is a snowmobile. However, it is contemplated that the snowmobile 10 could be any other suitable vehicle in other embodiments. Moreover, it should be understood that the snowmobile 10 could be configured differently, having a construction other than the one shown and described herein.

The snowmobile 10 has a front end 52 and a rear end 54, which are defined with respect to the forward travel direction of the snowmobile 10. The snowmobile 10 has a chassis 56 which includes a tunnel 58 extending towards the rear end 54. Two skis 60 are provided at the front end 52 of the snowmobile 10 and a steering assembly 62, including a handlebar 64, is provided for steering the skis 60 to thereby steer the snowmobile 10. The skis 60 are operatively connected to the chassis 56 via a respective front suspension assembly 59. An engine 66 and a belt transmission system 68 (shown schematically in FIG. 1) are disposed near the front end 52 of the snowmobile 10 and are enclosed by fairings 70 which protect the engine 66 and the belt transmission system 68.

In a rear section of the snowmobile 10, an endless drive track 72 is disposed under the tunnel 58. The endless drive track 72 is operatively connected to the engine 66 through the belt transmission system 68. The endless drive track 72 is driven to run about a rear suspension assembly 74 for propulsion of the snowmobile 10. The rear suspension assembly 74 includes a slide frame assembly 76 which primarily includes a pair of spaced apart slide rails that engage the inner side of the ground-engaging portion of the endless drive track 72. A snowflap 78 is disposed at the rear end 54 of the snowmobile 10, rearwardly of the endless drive track 72.

A driver seat 80 is installed in the rear section of the snowmobile 10. A rear portion of the seat 80 may include a storage compartment, or may be used to accept a passenger seat (not shown).

The snowmobile 10 has other features and components which would be readily recognized by one of ordinary skill in the art and therefore will not be described herein.

Figure 2A:
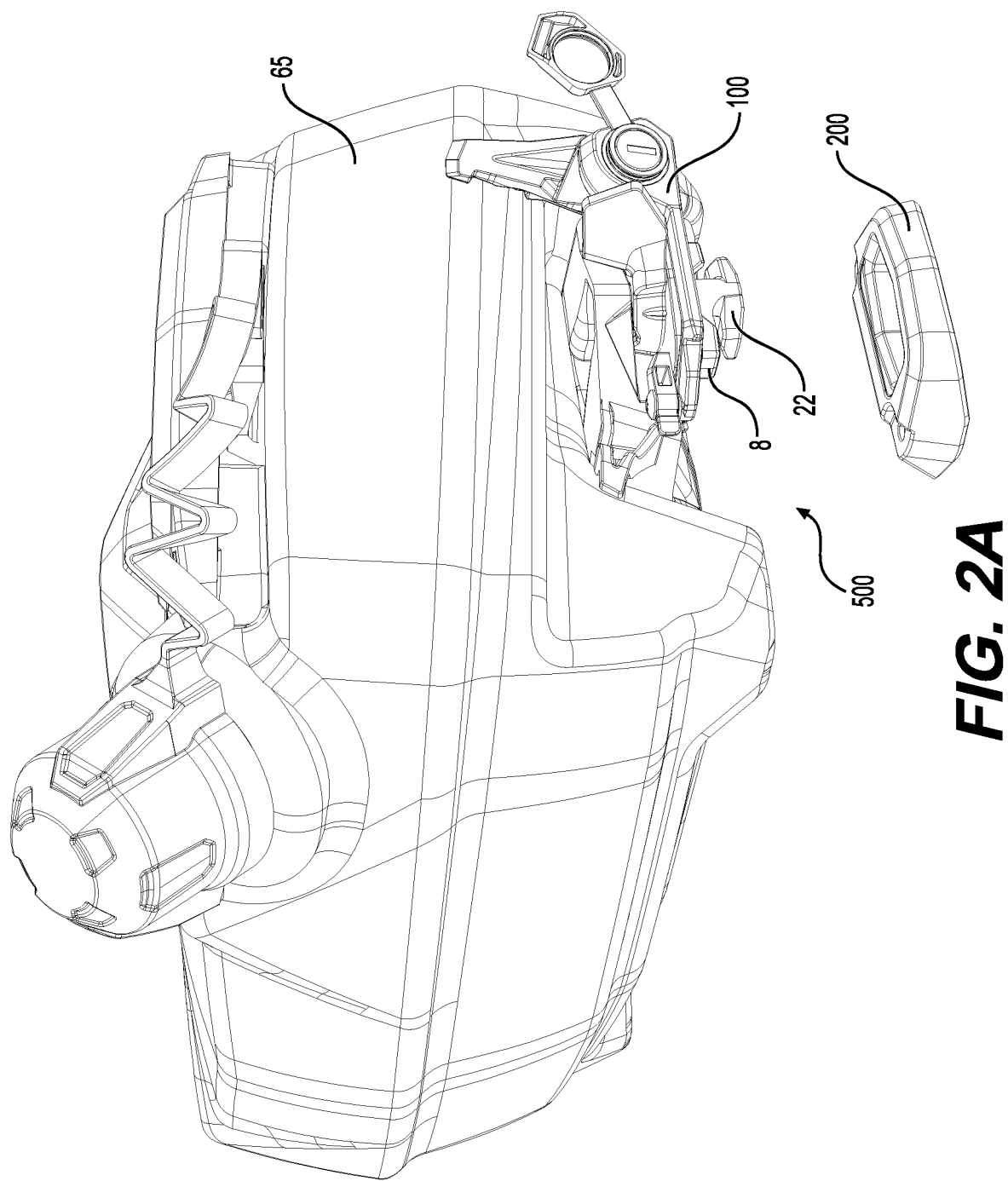
FIG. 2A is a perspective view of an accessory and an anchoring system for connecting the accessory to the snowmobile of FIG. 1, an anchor of the anchoring system shown disconnected from an anchor fixture configured to be connected to the snowmobile.
Figure 2B:
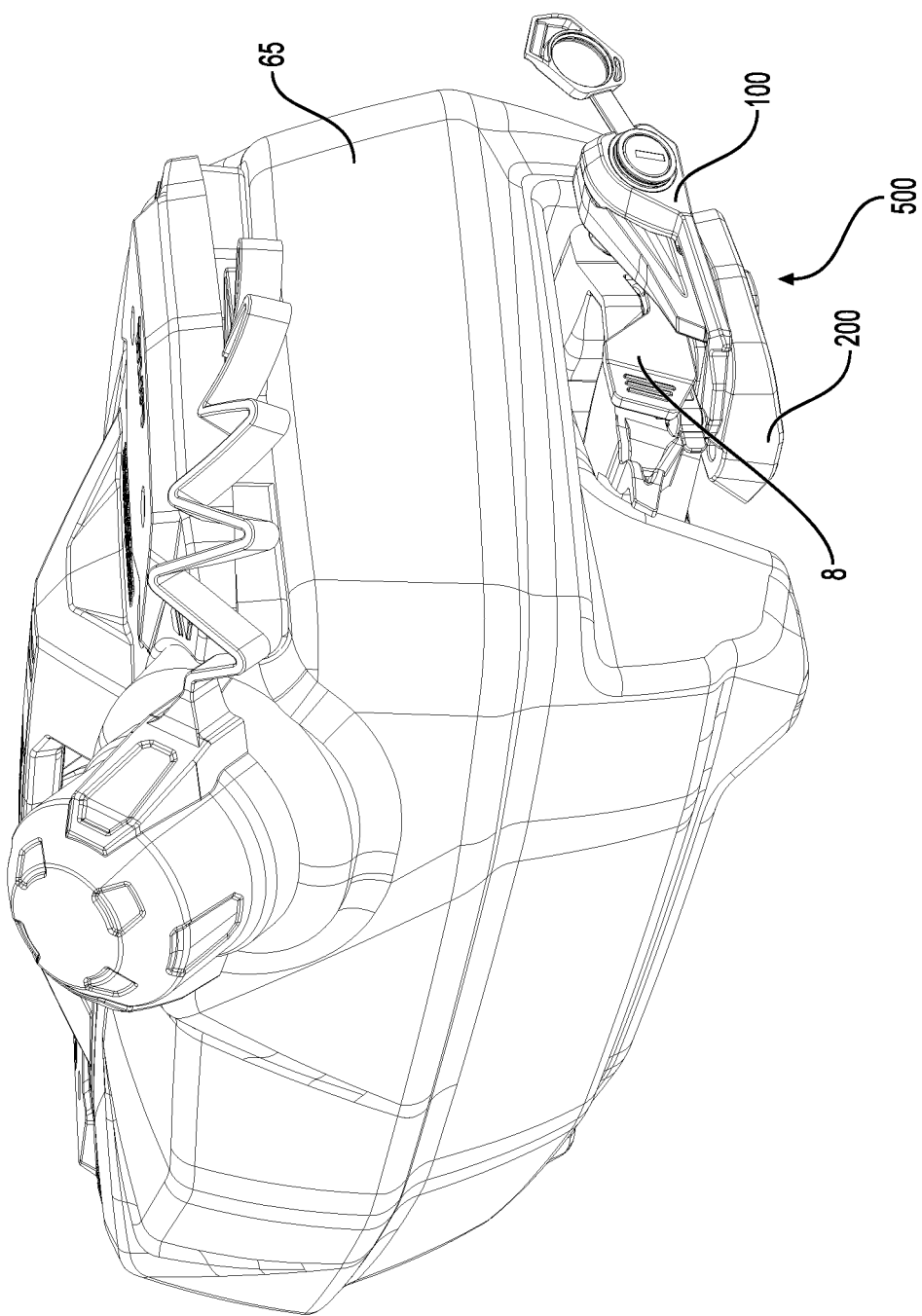
FIG. 2B is a perspective view of the accessory and anchoring system of FIG. 2A, with the anchor shown connected to the anchor fixture.

With reference to FIGS. 2A and 2B, an accessory 65 is configured to be anchored rearward of the seat 80 to an upper surface 82 of the tunnel 58 via an anchoring system 500 in accordance with an embodiment of the present technology. In this embodiment, the accessory 65 is a jerry can used for transporting fuel on longer excursions, however it is contemplated that the accessory 65 could be any other suitable accessory in other embodiments.

As can be seen, the anchoring system 500 includes an anchor 8, an anchor fixture 200 and a locking device 100. Notably, as will be explained in more detail below, the anchor 8 is secured to the anchor fixture 200 which is fastened to the upper surface 82 of the tunnel 58.

With reference to FIG. 3, the anchor 8 includes an anchor base 20 having a bottom portion 21 and a top portion 32 extending generally perpendicular to the bottom portion 21. The bottom portion 21 of the anchor base 20 has an upper flange 23 and a pair of tabs 25 extending downwardly from the upper flange 23. The top portion 32 of the anchor base 20 is configured to be fastened to the accessory 65. Notably, in this embodiment, the top portion 32 defines openings 31 configured to receive respective fasteners therein that securely engage the accessory 65. In some embodiments, the accessory 65 may define an aperture suitable to receive part of the bottom portion 21 therethrough, and the accessory 65 is held between the anchor 8 and the anchor fixture 200.

A fastener portion 22 of the anchor 8 extends below the bottom portion 21 of the anchor base 20 and is pivotably connected thereto. The fastener portion 22 is configured to be inserted into an aperture 230 of the anchor fixture 200 for securing the anchor 8 to the anchor fixture 200 in a manner that will be described below. The fastener portion 22 and the tabs 25 of the anchor base 20 are separated by a space 24. The fastener portion 22 is rotatable, about an axis 26 perpendicular to the bottom portion 21 of the anchor base 20, between an unfastened position (illustrated in FIG. 3) and a fastened position (illustrated in FIG. 5C) that are separated by a quarter turn of the fastener portion 22. In the unfastened position, the fastener portion 22 can be inserted into and removed through the aperture 230 of the anchor fixture 200. Notably, in the unfastened position, the fastener portion 22 is disposed parallel to the bottom portion 21 of the anchor base 20 such that both the fastener portion 22 and the bottom portion 21 of the anchor base 20 extend in the same direction. On the other hand, in the fastened position, the fastener portion 22 cannot be inserted into or removed through the aperture 230 of the anchor fixture 200. Particularly, as shown in FIG. 5C, in the fastened position, the fastener portion 22 is disposed perpendicular to the bottom portion 21 of the anchor base 20 (i.e., the fastener portion 22 extends in a direction perpendicular to the direction in which the bottom portion 21 of the anchor base 20 extends).

In order to pivot the fastener portion 22 between the unfastened and fastened positions, the anchor 8 has a lever 30 configured to be handled by a user. The lever 30 has a lever base 34 and a lever handle 36 extending from the lever base 34. The lever handle 36 is configured to be operated by the user to pivot the lever 30. The lever handle 36 has a base end 35 (FIG. 5B) adjacent to the lever base 34 and a free end 40 distanced from the base end 35. The lever base 34 of the lever 30 is operatively connected to the fastener portion 22 via the stem 28 to pivot the fastener portion 22 between the fastened and unfastened positions. For instance, in this embodiment, the lever base 34 of the lever 30 is connected to the stem 28 via a splined engagement. As can be seen, the lever 30 is disposed atop the bottom portion 21 of the anchor base 20 and is pivotably connected thereto. As such, the bottom portion 21 of the anchor base 20 is disposed between the lever 30 and the fastener portion 22 of the anchor 8. The lever 30 is pivotable about the axis 26 between an open position and a closed position for pivoting the fastener portion 22 between the unfastened and fastened positions respectively. More particularly, in this embodiment, the lever 30 is pivoted by 90° relative to the bottom portion 21 of the anchor base 20 from the open position to the closed position so as to correspondingly pivot the fastener portion 22 by 90° relative to the bottom portion 21 of the anchor base 20 from the unfastened position to the fastened position. It is contemplated that the fastener portion 22 could be turned by more or less than 90° from the unfastened position to the fastened position. It is also contemplated that the lever 30 could be turned by more or less than 90° between its open and closed positions.

A more detailed description of anchors similar in construction to the anchor 8 is provided in International Patent Application Publication No. WO 2012/002959, published on Jan. 5, 2012, the entirety of which is incorporated herein by reference.

Figure 4A:
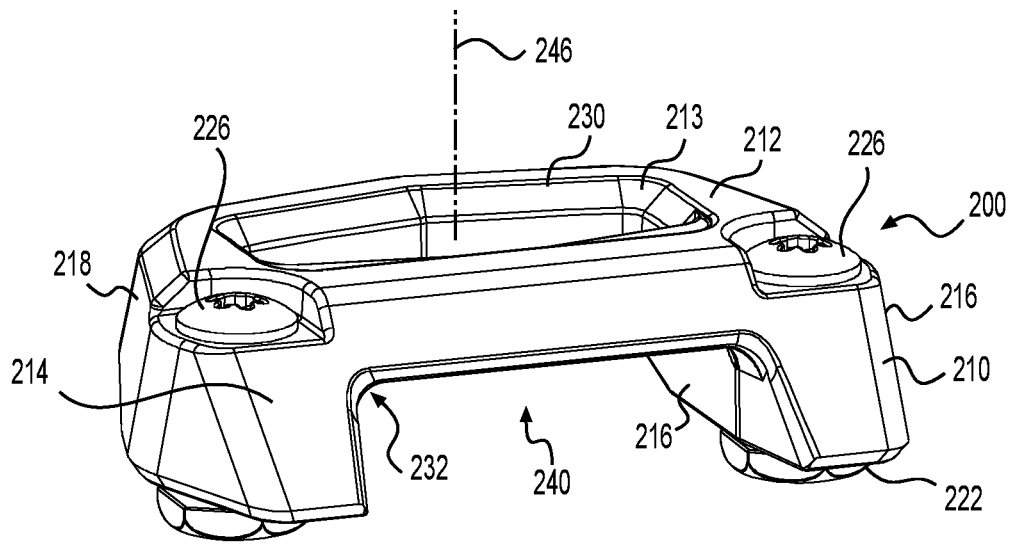
FIG. 4A is a perspective view, taken from a rear, left side, of the anchor fixture of FIG. 3.
Figure 4B:
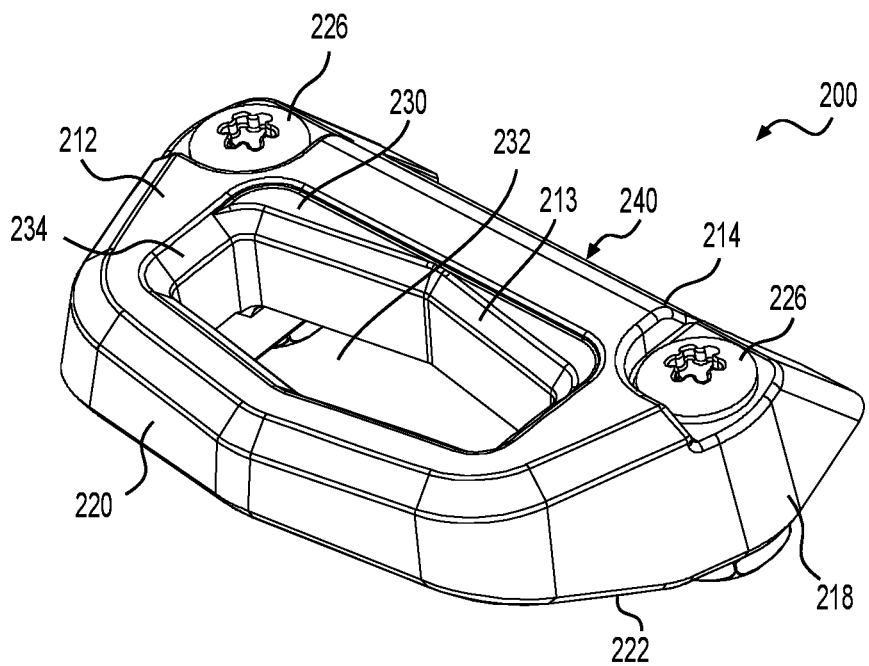
FIG. 4B is a perspective view, taken from a front, left side, of the anchor fixture of FIG. 3.

With reference to FIGS. 3, 4A and 4B, the anchor fixture 200 has a fixture body 210 having a top portion 212, a rear portion 214, a left side portion 216, a right side portion 218 and a front portion 220, each portion having an interior and an exterior surface. The fixture body 210 also has a base 222. The top portion 212 defines the anchor aperture 230 which is designed for the fastener portion 22 of the anchor 8 to be inserted and removed therethrough. The anchor aperture 230 is surrounded by a chamfered rim 213 formed by the top portion 212. The anchor aperture 230 defines a central axis 246 that is perpendicular to the anchor aperture 230. The anchor aperture 230 leads downwards through the top portion 212 to an anchor chamber 232 configured to house the fastener portion 22 of the anchor 8 therein. The anchor chamber 232, below the anchor aperture 230, extends outwards towards the rear portion 214. The anchor chamber 232 leading from the anchor aperture 230 is bounded partly by the interior surfaces of the fixture body 210, however, it is contemplated that the anchor chamber 232 could have more or fewer boundary surfaces.

The anchor aperture 230 has a shape similar to a shape of the fastener portion 22 of the anchor 8. Notably, in this embodiment, the anchor aperture 230 is in the shape of an irregular hexagon. It is contemplated that the anchor aperture 230 could have any other suitable shape such as circular, elliptical, polygonal and the like, depending on the shape of the fastener portion 22 and the mechanism contemplated for use with the anchor fixture 200.

As shown in FIGS. 4A and 4B, the rear portion 214 of the anchor fixture 200, which is generally perpendicular to the top portion 212, defines a fastener aperture 240 designed for the insertion of a tongue fastener (not shown) for securing another accessory to the snowmobile 10. Notably, another accessory provided with a tongue fastener can be secured to the anchor fixture 200 by inserting the tongue fastener into the chamber 232 through the fastener aperture 240.

Two fasteners 226 are inserted through respective fastener holes 224 in the fixture body 210 to secure the fixture 200 to the upper surface 82 of the tunnel 58 (or any other suitable surface of the vehicle 10). In this embodiment, a central axis of the fastener aperture 240 (axis perpendicular to the fastener aperture 240) is perpendicular to the central axis 246 of the anchor aperture 230 and parallel to the base 222. The central axis of the fastener aperture 240 generally defines an acute angle with the base 222.

A more detailed description of anchor fixtures similar in construction to the anchor fixture 200 is provided in U.S. Pat. No. 9,751,592, issued on Sep. 5, 2017, the entirety of which is incorporated herein by reference. The anchor fixture 200 will therefore not be described in more detail herein. Furthermore, it should be noted that the anchor fixture 200 is not essential to the functioning of the system 500 as it could be replaced by a rack with a suitable shaped aperture as described in International Patent Application Publication No. WO 2012/002959.

Figure 5A:
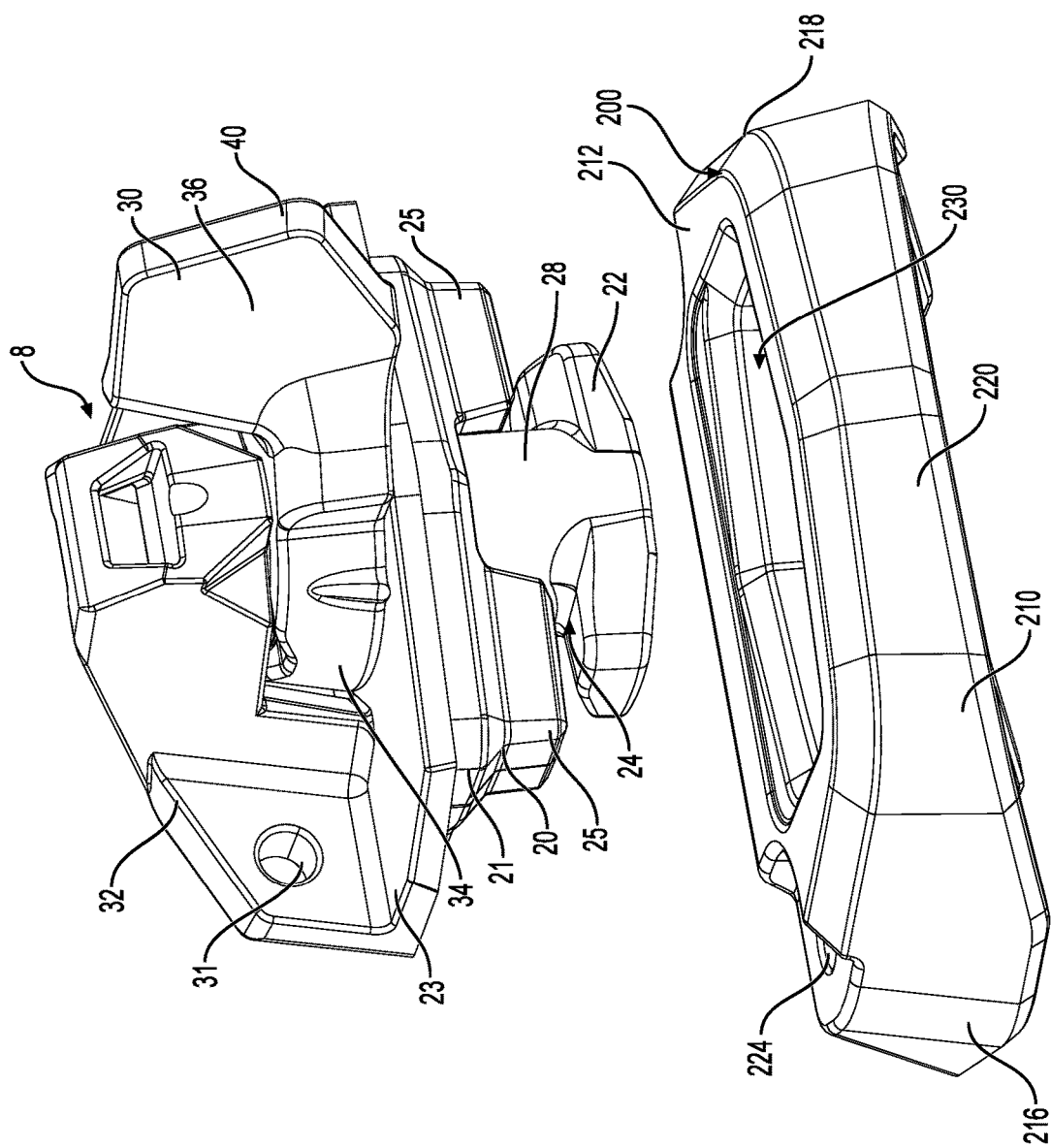
FIG. 5A is an exploded view of the anchor and anchor fixture of FIG. 3, shown without the locking device.
Figure 5B:
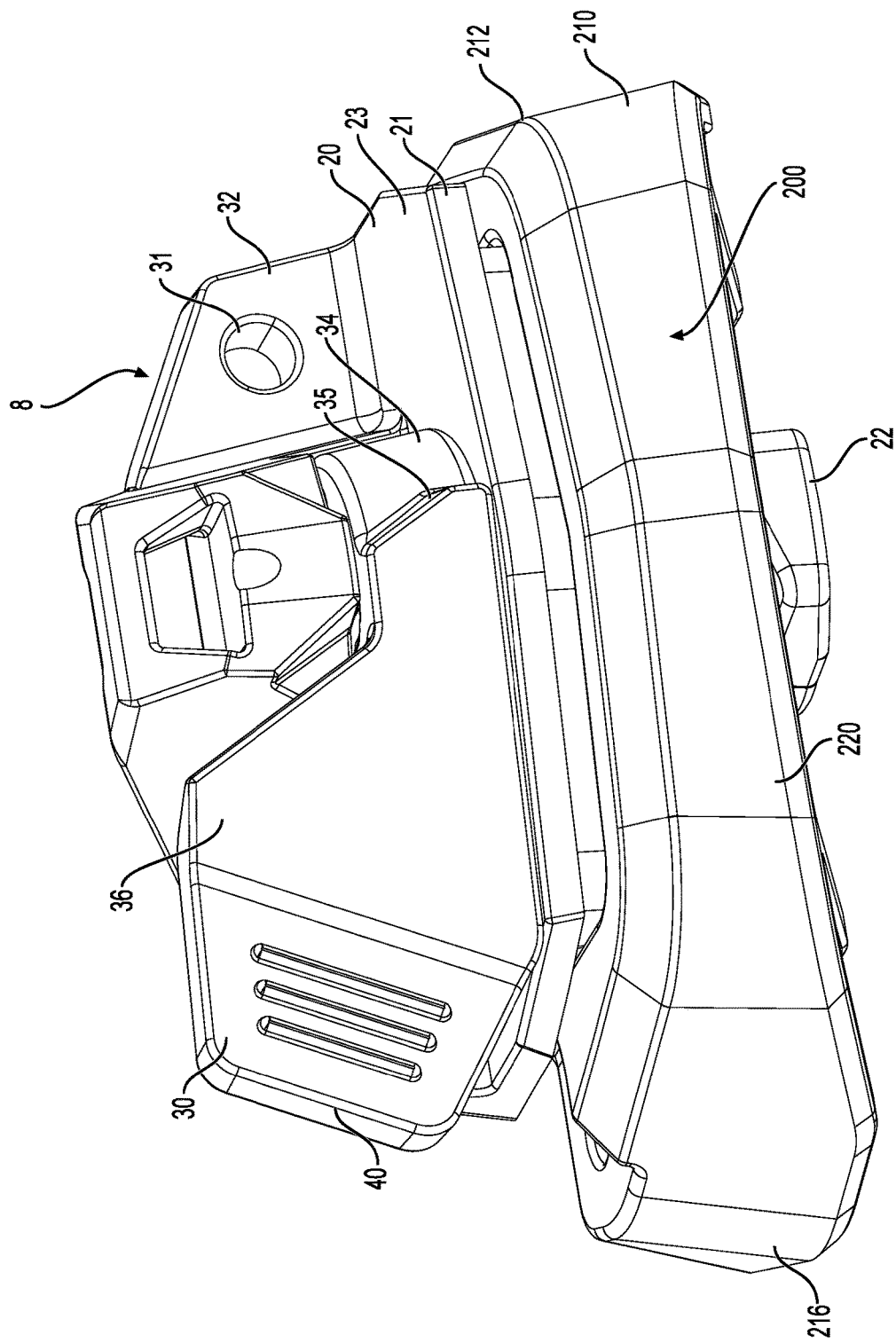
FIG. 5B is a perspective view, taken from a front, right side, of the anchor and anchor fixture of FIG. 3, showing the anchor fastened to the anchor fixture without the locking device.
Figure 5C:
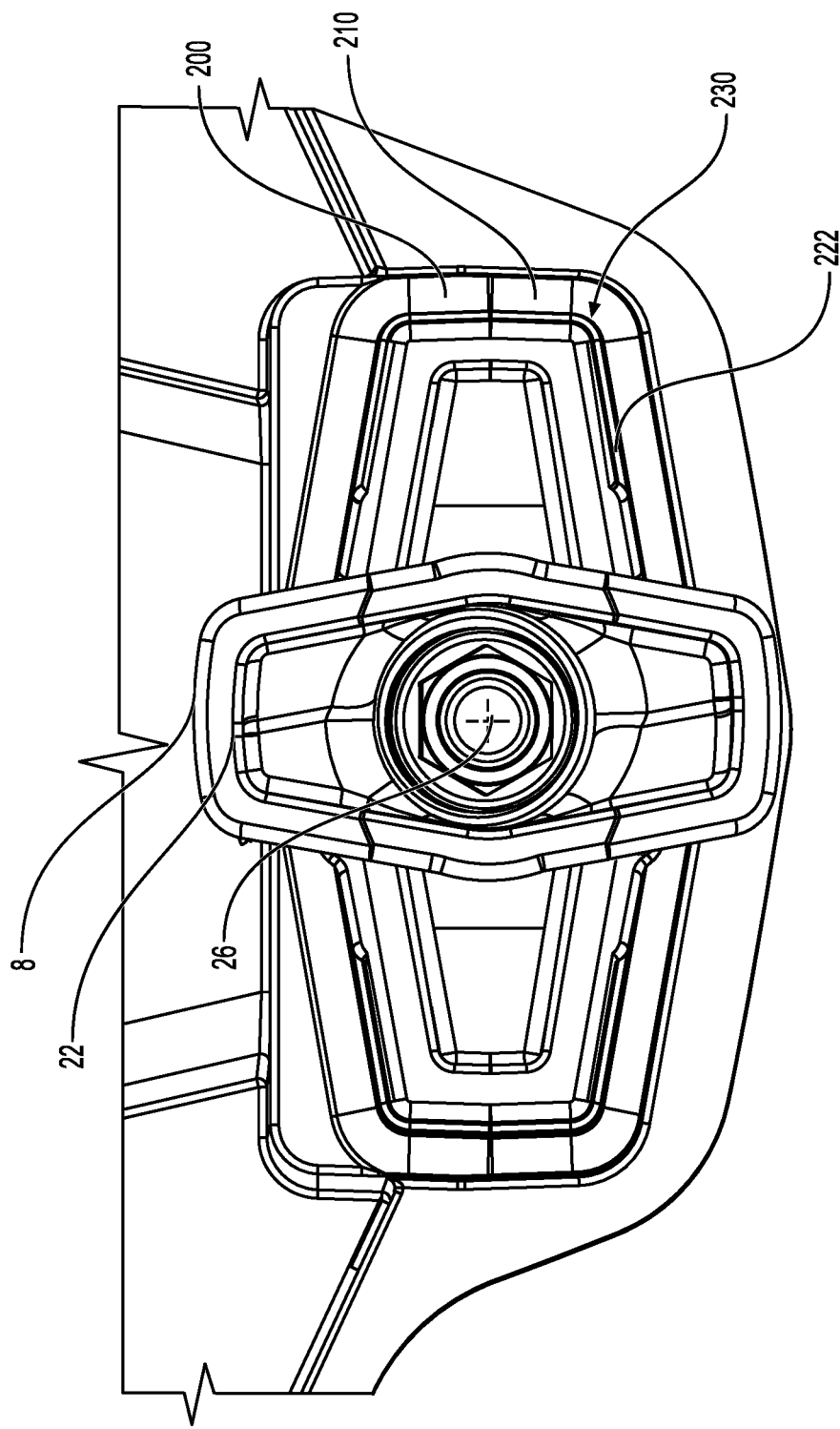
FIG. 5C is a bottom plan view of the anchor and anchor fixture of FIG. 5B.

With reference to FIGS. 5A and 5B, the anchor 8 and the anchor fixture 200 can be used together without the locking device 100. Notably, in order to fasten the anchor 8 to the anchor fixture 200 without using the locking device 100, the anchor lever 30 is pivoted to the open position so as to pivot the fastener portion 22 of the anchor 8 to the unfastened position. The fastener portion 22 of the anchor 8 is then inserted into the anchor chamber 232 through the anchor aperture 230 of the anchor fixture 200. In the unfastened position, when the fastener portion 22 has been inserted through the fastener aperture 230 of the anchor fixture 200, the fastener portion 22 is oriented to be removed through the fastener aperture 230 of the anchor fixture 200. The anchor lever 30 is thus pivoted to the closed position so as to pivot the fastener portion 22 to the fastened position. The fastener portion 22 selectively engages the interior surface of the top portion 212 of the fixture body 210 when rotated between the fastened and unfastened positions. In the fastened position of the fastener portion 22, when the fastener portion 22 has been inserted through the fastener aperture 230 of the anchor fixture 200, the anchor 8 cannot be disengaged from the anchor fixture 200 since the fastener portion 22 is oriented so that it cannot be removed through the anchor aperture 230.

While the anchor 8 and the anchor fixture 200 could be used on their own to secure the accessory 65 to the snowmobile 10 in the manner described above, any person with access to the snowmobile 10 could potentially operate the anchor 8 to remove the accessory 65 from the snowmobile 10 unbeknownst to the driver. Therefore, as shown in FIG. 3, the anchoring system 500 also includes a locking device 100 provided to prevent unauthorized users from disengaging the anchor 8 from the anchor fixture 200. More specifically, the locking device 100 is operable to selectively lock and unlock the anchor 8 so as to respectively prevent or allow the operation of the anchor 8.

With reference to FIGS. 3 and 6 to 10, the locking device 100 has a lock body 102 extending from a first lateral end 103 to a second lateral end 105. The lock body 102 includes a horizontal portion 104 and a vertical portion 106. The vertical portion 106 extends upwardly from and generally perpendicular to the horizontal portion 104. The horizontal portion 104 is generally planar (i.e., flat) such that a majority of an upper surface thereof extends along a common plane. The vertical portion 106 is disposed adjacent a front edge 108 of the lock body 102 (opposite a rear edge 110 thereof) and extends along a limited portion of the length of the lock body 102 defined between the lateral ends 103, 105 thereof.

The horizontal portion 104 defines a fastener aperture 112 configured to receive part of the anchor 8 therethrough. In particular, the fastener aperture 112 is configured to receive the fastener portion 22 of the anchor 8 therethrough while accommodating the tabs 25 of the bottom portion 21 of the anchor base 20. As such, the fastener aperture 112 is shaped and sized so as to receive the tabs 25 of the bottom portion 21 of the anchor base 20 therein. In this embodiment, the fastener aperture 112 has a generally pentagonal shape. Other shapes are contemplated for the fastener aperture 112, depending on the shape of the tabs 25 of the anchor 8.

In this embodiment, the horizontal portion 104 of the lock body 102 also defines a lever aperture 109 adjacent the front edge 108 of the lock body 102. The lever aperture 109 is located near the second lateral end 105 of the lock body 102 and is configured to receive part of a lock lever 114 of the locking device 100 therein, as will be explained in more detail below.

The locking device 100 has a retaining member 140 for connecting the lock body 102 to the anchor base 20 of the anchor 8, as will be described in more detail below. The retaining member 140 is movably connected to the horizontal portion 104 of the lock body 102 so that the retaining member 140 is movable relative to the lock body 102 between a retaining position (illustrated in FIGS. 9 and 10) and a free position (illustrated in FIGS. 6 and 7). As can be seen, in the retaining position, part of the retaining member 140 extends above the fastener aperture 112 of the lock body 102. In the free position, the retaining member 140 extends clear of the fastener aperture 112 so that the retaining member 140 does not overlap the fastener aperture 112.

In this embodiment, the retaining member 140 is pivotably connected to the horizontal portion 104 of the lock body 102 such that the retaining member 140 is pivotable between the retaining and free positions. In particular, the retaining member 140 is pivotable about a retaining member pivot axis 142 that extends generally perpendicular to the horizontal portion 104 of the lock body 102. A fastener 157 extends through the retaining member 140 and engages the horizontal portion 104 of the lock body 102 to define the retaining member pivot axis 142. The retaining member 140 is disposed atop the horizontal portion 104 of the lock body 102, near the lateral end 105.

In order to selectively block operation of the anchor 8 as will be described in greater detail below, the locking device 100 has the lock lever 114 pivotably connected to the lock body 102. Notably, the lock lever 114 is pivotable between a locked position (illustrated in FIGS. 9 and 10) and an unlocked position (illustrated in FIGS. 3, 6 and 7) to respectively block and allow operation of the anchor 8 by a user.

Figure 7:
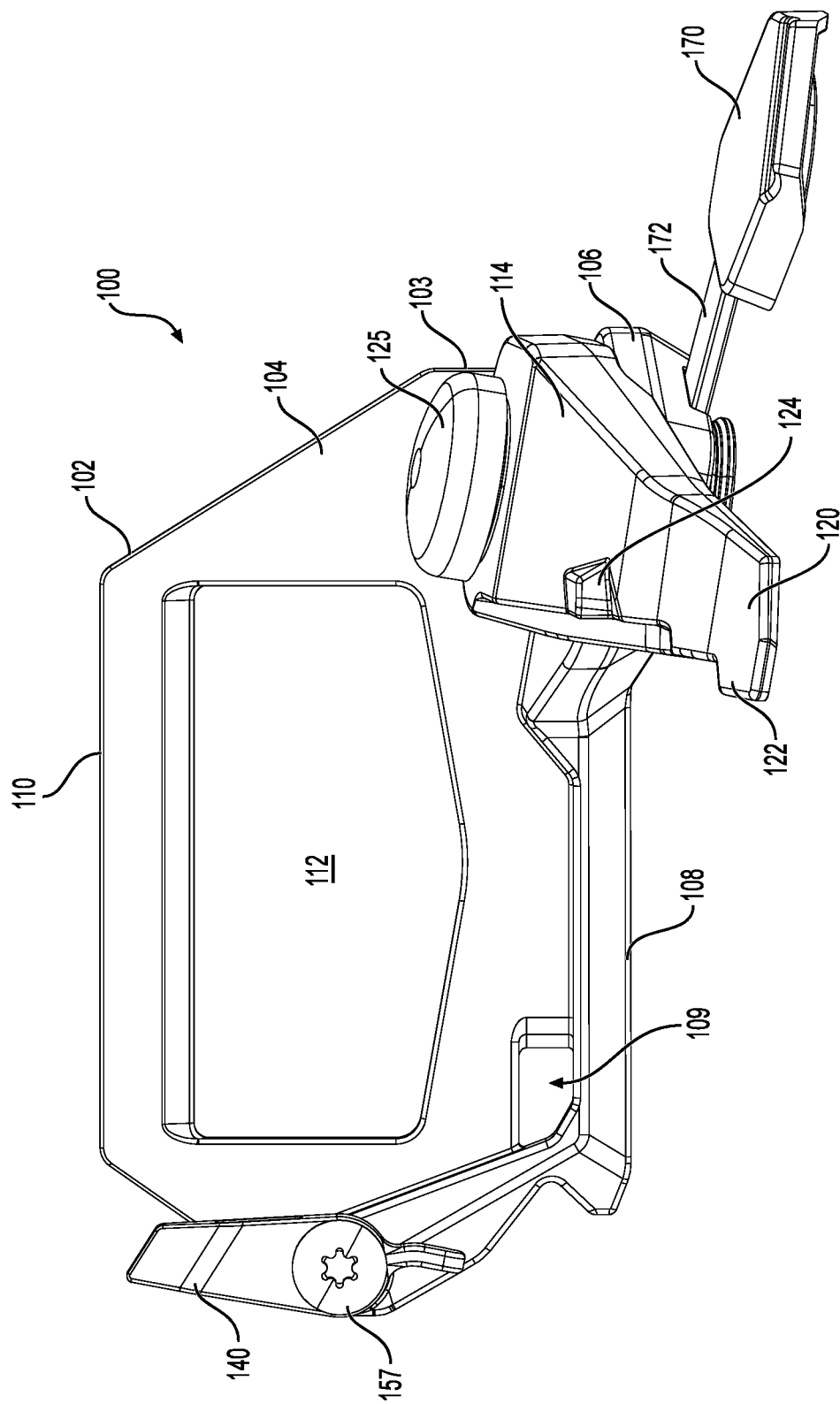
FIG. 7 is a top plan view of the locking device of FIG. 6.
Figure 8:
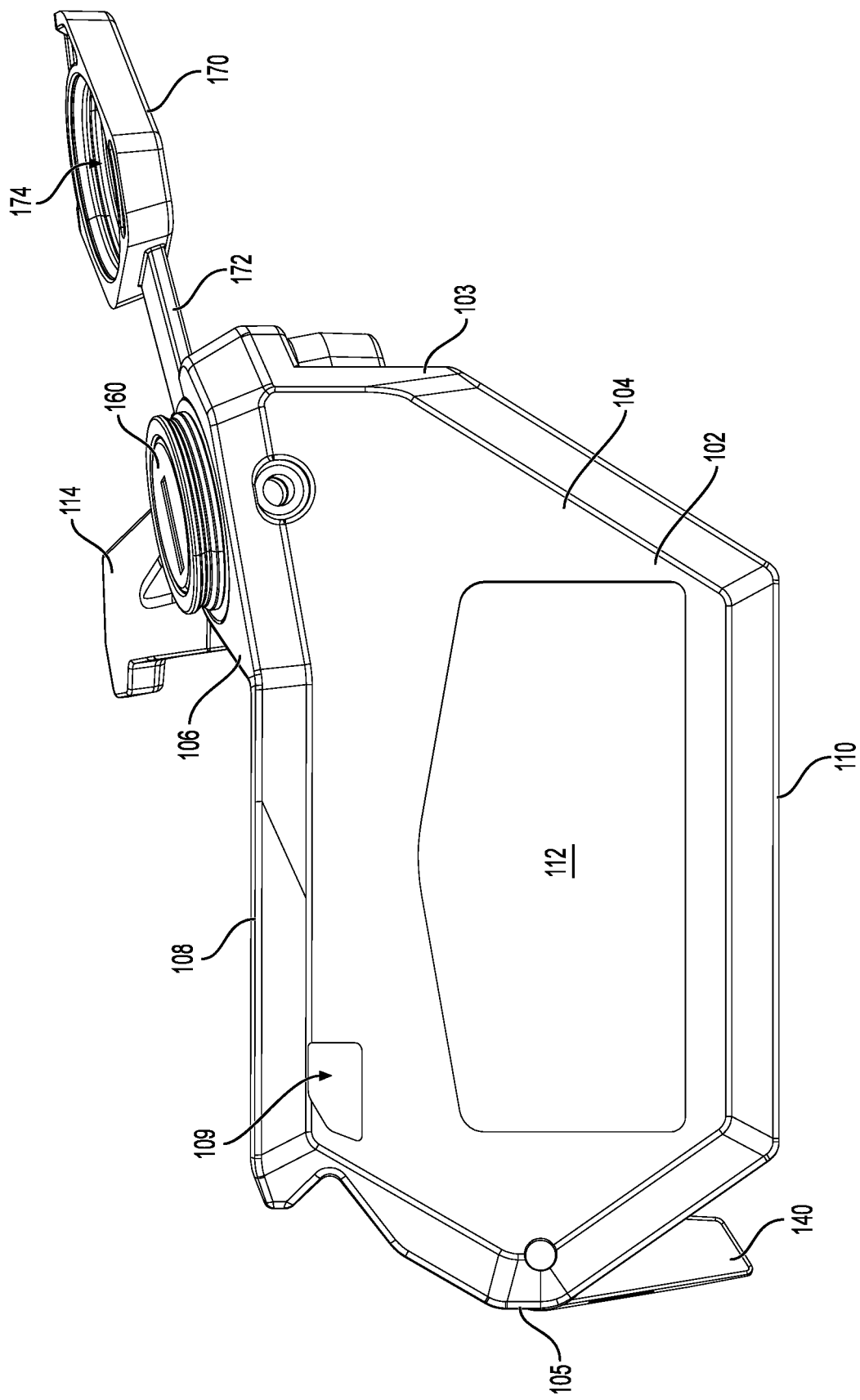
FIG. 8 is a bottom plan view of the locking device of FIG. 6.
Figure 9:
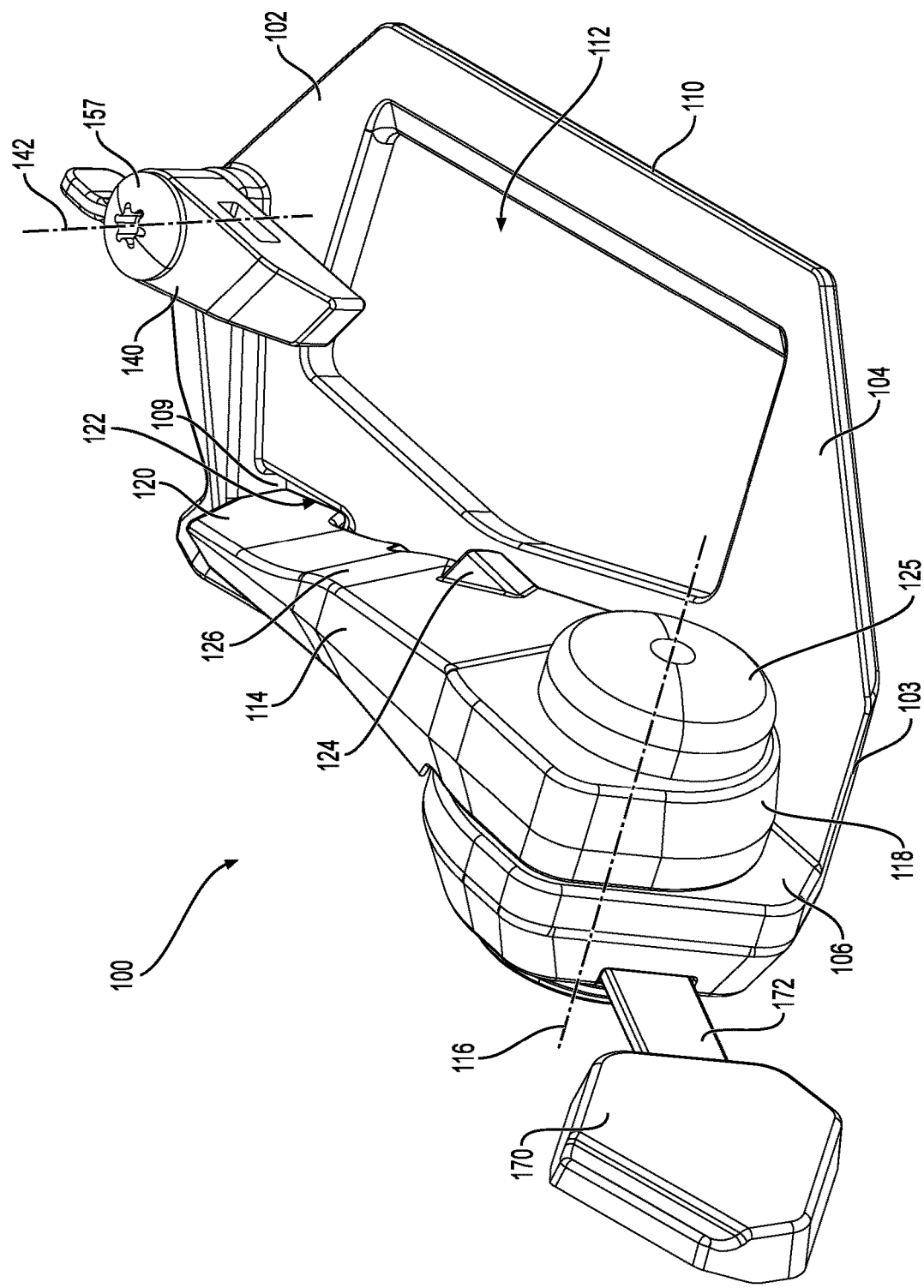
FIG. 9 is a perspective view, taken from a rear, left side, of the locking device of FIG. 3, showing the lock lever thereof in a locked position.
Figure 10:
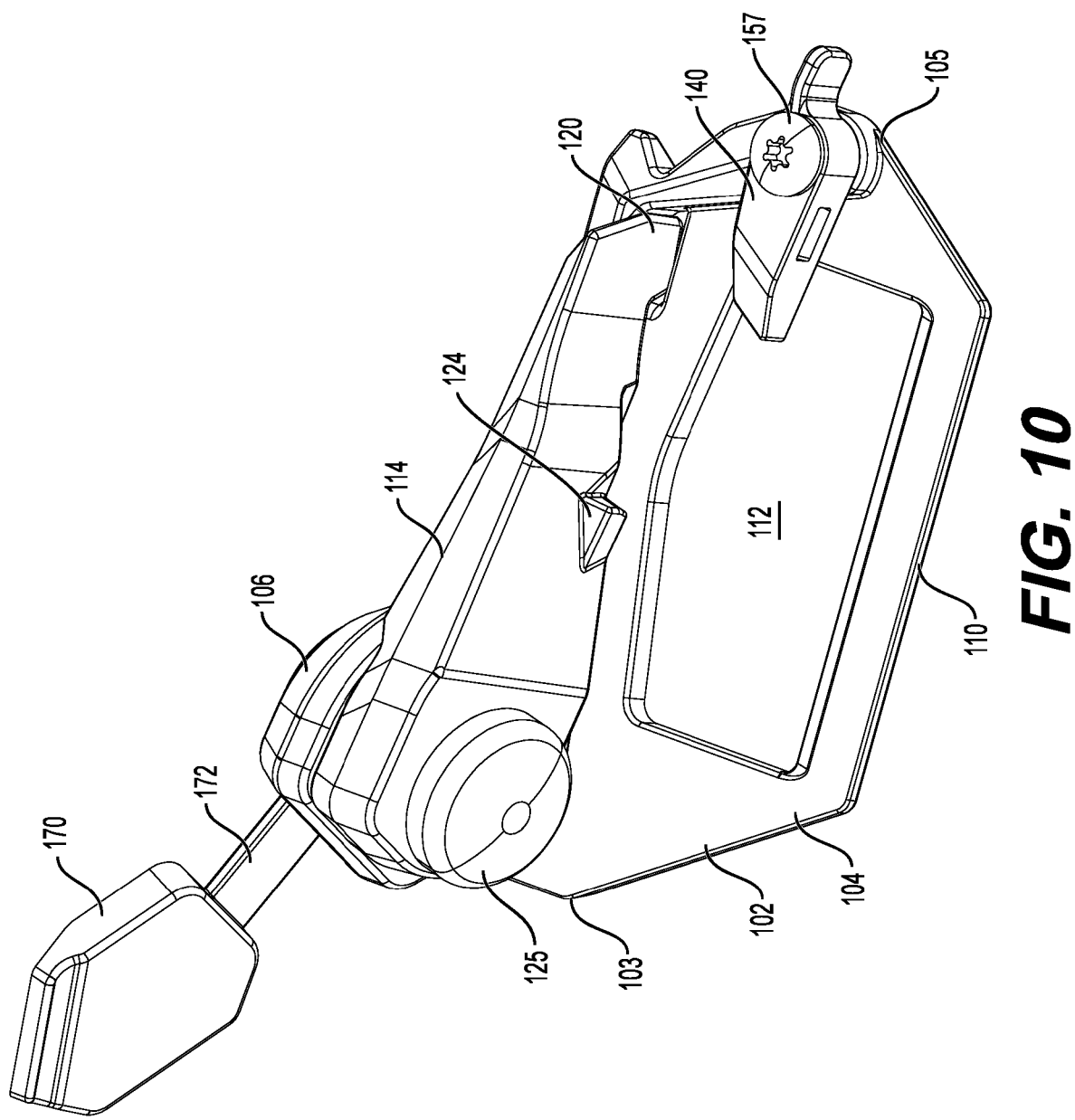
FIG. 10 is a perspective view, taken from a rear, right side, of the locking device of FIG. 9.

In this embodiment, the lock lever 114 is pivotably connected to the vertical portion 106 of the lock body 102 about a lock pivot axis 116 extending generally parallel to the horizontal portion 104 (and generally perpendicular to the retaining member pivot axis 142). In particular, a base 118 of the lock lever 114 is pivotably connected to the vertical portion 106 of the lock body 102 while a tip 120 of the lock lever 114 (opposite the base 118) is a free end of the lock lever 114. As shown in FIGS. 7 and 9, a support member 125 is connected on an opposite of the base 118 of the lock lever 114 from the vertical portion 106. As such, the base 118 is pivotably connected between the vertical portion 106 and the support member 125.

In this embodiment, the lock lever 114 generally decreases in size from the base 118 to the tip 120. Moreover, the tip 120 is shaped to have a bottom portion 122 that protrudes from a remainder of a lower edge of the lock lever 114. As shown in FIG. 9, the bottom portion 122 of the tip 120 is received in the lever aperture 109 when the lock lever 114 is in the locked position. This prevents the tip 120 of the lock lever 114 from being moved inwardly which may be helpful to prevent prying of the lock lever 114 which might in some cases cause it to break.

Figure 18:
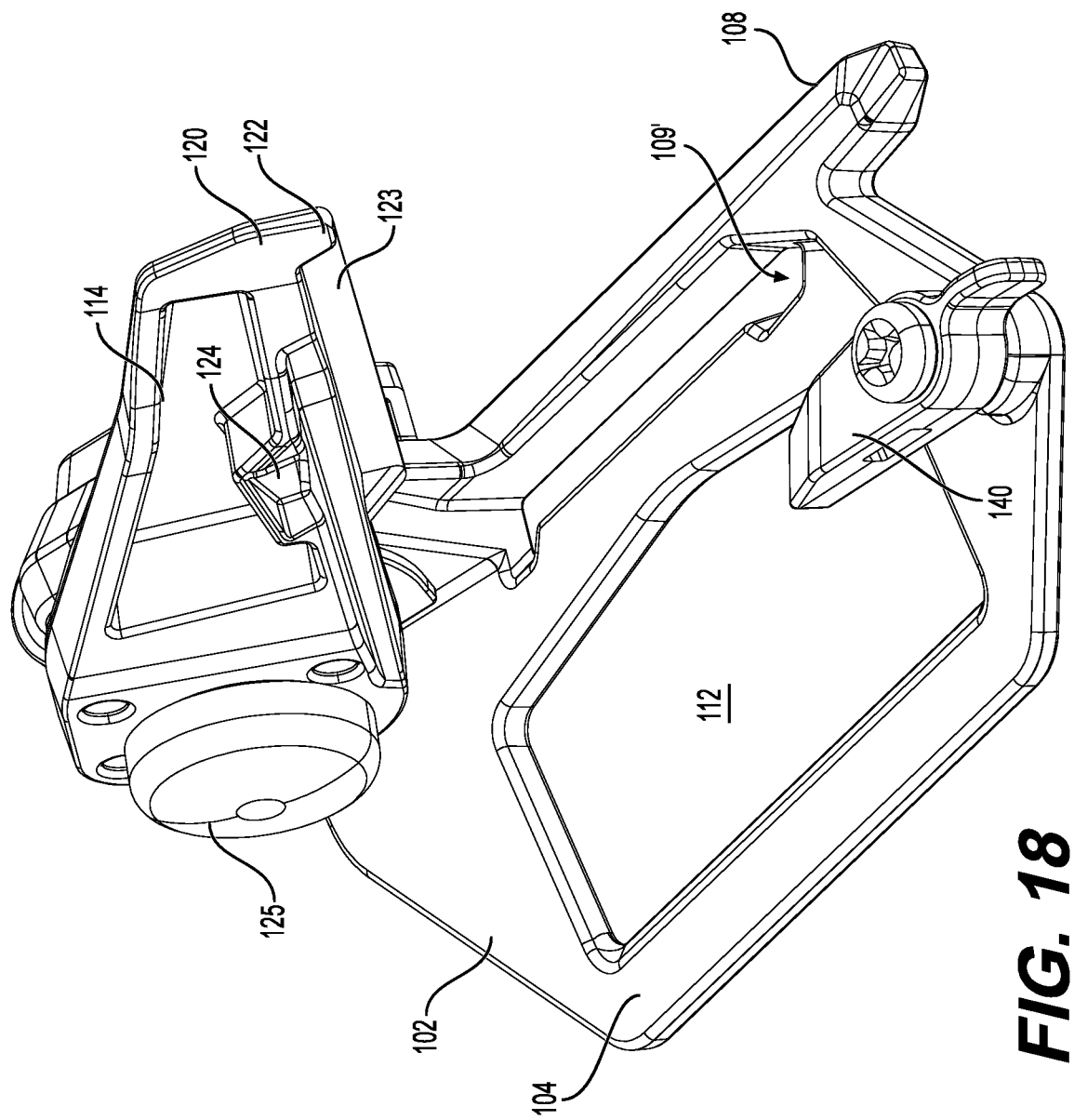
FIG. 18 is a perspective view, taken from a rear, right side, of the locking device according to another embodiment.

In an alternative embodiment, as shown in FIG. 18, the lock lever 114 has a bottom extension 123 extending generally along the lock lever 114 to the bottom portion 122 of the tip 120. In this alternative embodiment, the bottom portion 122 of the tip 120 does not protrude from a remainder of the lower edge of the lock lever 114, notably as the bottom extension 123 is generally level with the bottom portion 122. The horizontal portion 104 of the lock body 102 also defines a lever aperture 109' that is longer than the lever aperture 109 described above. Notably, the lever aperture 109' is adjacent the front edge 108 of the lock body 102 and is dimensioned to receive both the bottom portion 122 of the tip 120 and the bottom extension 123 in the locked position of the lock lever 114.

Returning now to FIG. 9, the lock lever 114 has a locking projection 124 which extends from an inner surface 126 of the lock lever 114 (opposite an outer surface thereof) facing toward the fastener aperture 112 when the lock lever 114 is in the locked position. As will be described in greater detail below, the locking projection 124 is configured to abut a portion of the anchor lever 30 when the anchor lever 30 is in the closed position. Moreover, in this embodiment, the locking projection 124 is located approximately centrally between the base 118 and the tip 120 of the lock lever 114.

The locking device 100 also has a key post 160 to allow only authorized users to operate the lock lever 114. Notably, the key post 160 defines a key aperture 162 for receiving a key (not shown). Only a person in possession of the key can thus operate the key post 160. In particular, the key post 160 is movably connected to the vertical portion 106 of the lock body 102 and is movable by the key from an unsecured position (shown in FIGS. 3 and 11 to 13) to a secured position (shown in FIGS. 14, 16). In this embodiment, the key post 160 is pivotable about the lock pivot axis 116 between the unsecured and secured positions.

In this embodiment, the key post 160 is operatively connected to the lock lever 114 and therefore the lock lever 114 is pivoted between the locked and unlocked positions by turning the key post 160 between the secured and unsecured positions. In particular, the lock lever 114 is pivoted to the locked position by the key post 160 when the key post 160 is moved to the secured position. On the other hand, the lock lever 114 is pivoted to the unlocked position by the key post 160 when the key post 160 is moved to the unsecured position.

It is contemplated that, in alternative embodiments, the key post 160 may not be operatively connected to the lock lever 114 so as to move the lock lever 114 between its locked and unlocked position. For instance, in such embodiments, moving the key post 160 to the secured position may simply prevent the lock lever 114 from moving, irrespective of the position of the lock lever 114, and the lock lever 114 is moved independently from the key post. It is contemplated that the lock lever 114 could be prevented from moving from the locked position by a device other than the key post 160. For example, the key post 160 could be replaced by a radio frequency identification (RFID) lock that can be unlocked only when a properly encoded RFID fob is put in proximity to the RFID lock.

Figure 17:
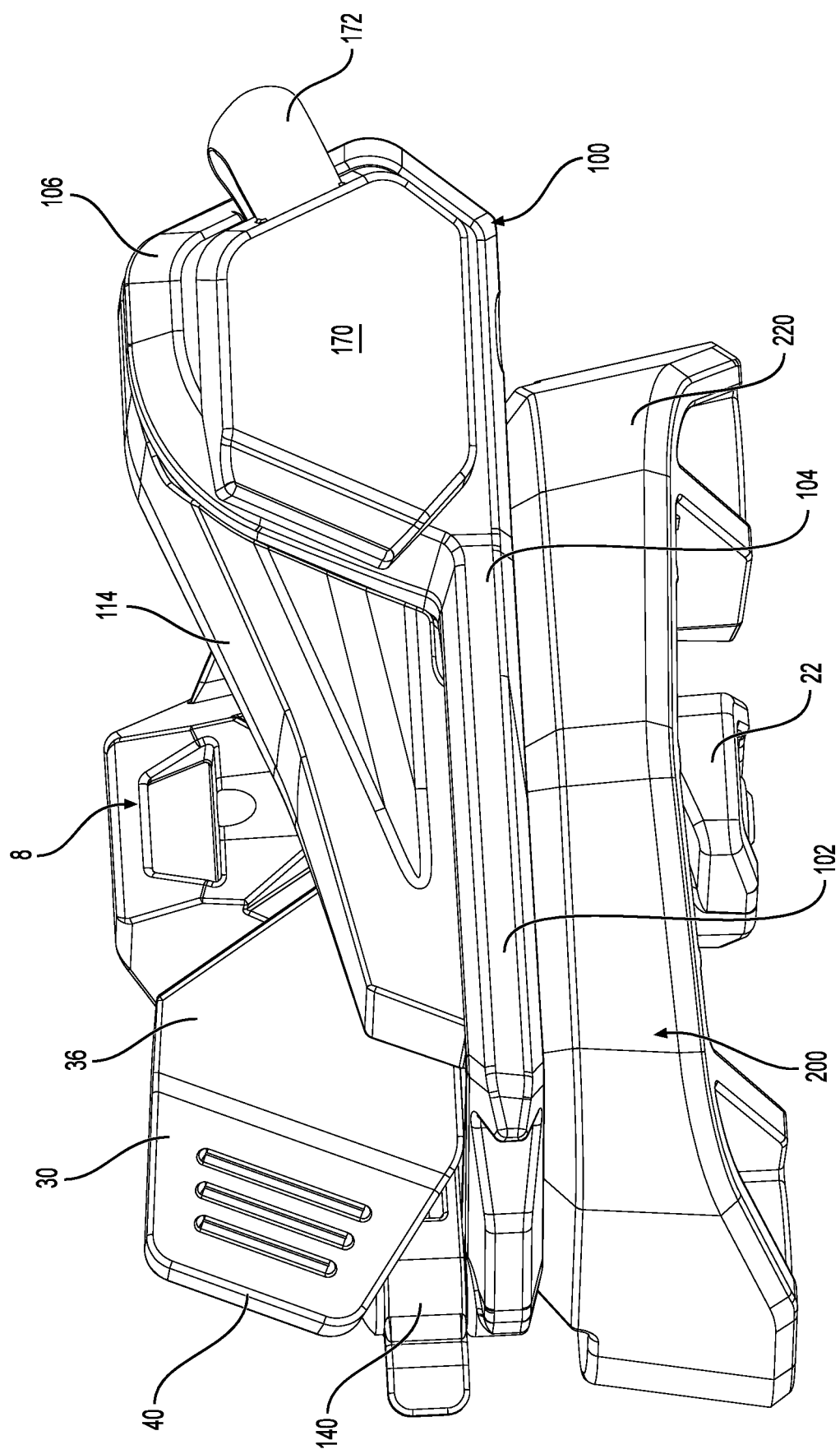
FIG. 17 is a front elevation view of the anchoring system of FIG. 14, showing a key cover of the locking device covering a key post thereof.

In this embodiment, the locking device 100 also has a key cover 170 for covering the key post 160. Notably, the key cover 170 can shield the key post 160 from being exposed to unfavorable environmental conditions including for example snow, debris, etc. The key cover 170 is connected to the key post 160 via a strip 172. The key cover 170 has a circular recess 174 that fits over the circular key post 160 to remain attached thereto (as shown in FIG. 17)

The manner in which the anchor 8, the locking device 100 and the anchor fixture 200 are used in conjunction to provide the anchoring system 500 to securely anchor the accessory 65 will now be described in detail with reference to FIGS. 11 to 17. As mentioned above, the anchor 8 is connected to the accessory 65 via the fastener openings 31 provided in the top portion 32 of the anchor base 20. Meanwhile, the anchor fixture 200 is affixed to the upper surface 82 of the tunnel 58 of the snowmobile 10.

Figure 11:
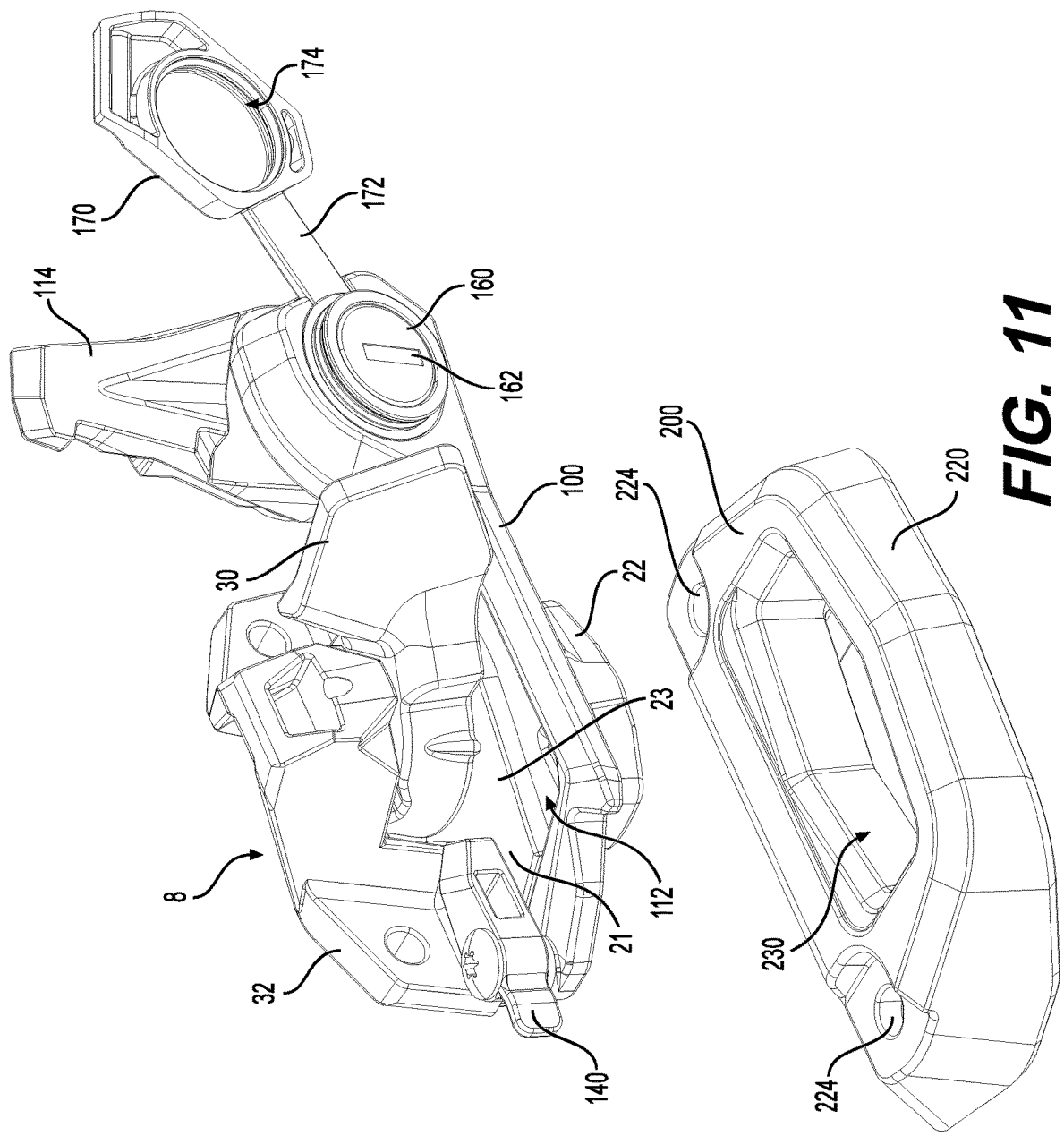
FIG. 11 is a partially exploded view of the anchoring system of FIG. 3, showing the anchor connected to the locking device.

Before connecting the anchor 8 to the locking device 100, the lock lever 114 is placed in the unlocked position and the retaining member 140 is placed in the free position. With reference to FIG. 11, the fastener portion 22 of the anchor 8 is then inserted through the fastener aperture 112 of the lock body 102 and the tabs 25 of the anchor base 20 are received within the fastener aperture 112. As such, the peripheral walls of the horizontal portion 104 of the lock body 102 defining the fastener aperture 112 surround the tabs 25. Notably, the upper flange 23 of the bottom portion 21 of the anchor base 20 is dimensioned bigger than the fastener aperture 112 and therefore extends above the horizontal portion 104 (i.e., is not inserted into the fastener aperture 112).

At this stage, the retaining member 140 is in the free position in which the retaining member 140 permits the anchor base 20 to be disconnected from the lock body 102. In other words, in the free position, the retaining member 140 permits the anchor 8 to be disengaged from the locking device 100. Therefore, once the upper flange 23 of the anchor 8 is resting atop the horizontal portion 104 of the lock body 102, the retaining member 140 of the locking device 100 is pivoted to the retaining position, as shown in FIG. 11. In the retaining position, the retaining member 140 connects the lock body 102 to the anchor base 20. In other words, in the retaining position, the retaining member 140 prevents the anchor 8 from being disengaged from the locking device 100. Notably, in the retaining position, at least part of the retaining member 140 extends above the upper flange 23 of the anchor base 20. As will be understood, the retaining member 140 is thus provided for convenience to prevent the locking device 100 from falling off from the anchor 8 when engaging and disengaging the anchor 8 with the anchor fixture 200. It is contemplated that the retaining member 140 could be omitted in other embodiments and the anchor 8 could instead be inserted simultaneously through the fastener apertures 112, 230, or alternatively the user could have to hold the anchor 8 together with the locking device 100 when engaging and disengaging the anchor fixture 200.

Figure 12:
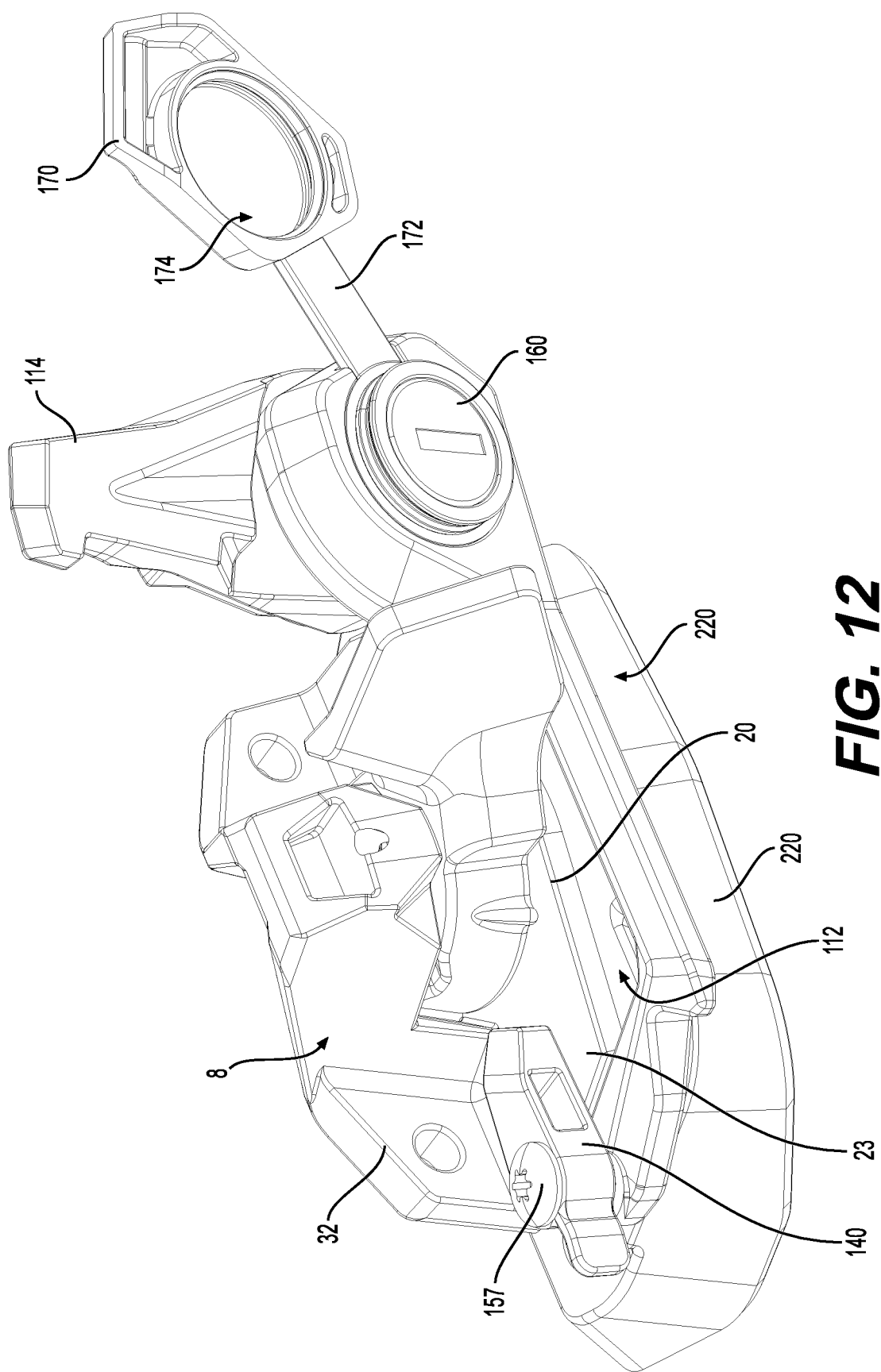
FIG. 12 is a perspective view, taken from a top, front, right side, of the anchoring system of FIG. 3, showing an anchor lever of the anchor in an open position and a retaining member of the locking device in a retaining position.

Next, as shown in FIG. 12, the assembly of the anchor 8 and the locking device 100 is moved so as to insert the fastener portion 22 of the anchor 8 through the fastener aperture 230 of the anchor fixture 200 such that the fastener portion 22 is contained within the chamber 232 of the anchor fixture 200. As will be understood, when the anchoring system 500 is in use (i.e., when the fastener portion 22 of the anchor 8 is in the chamber 232), the fastener aperture 112 of the locking device 110 is generally aligned with fastener aperture 230 of the anchor fixture 200.

Figure 13:
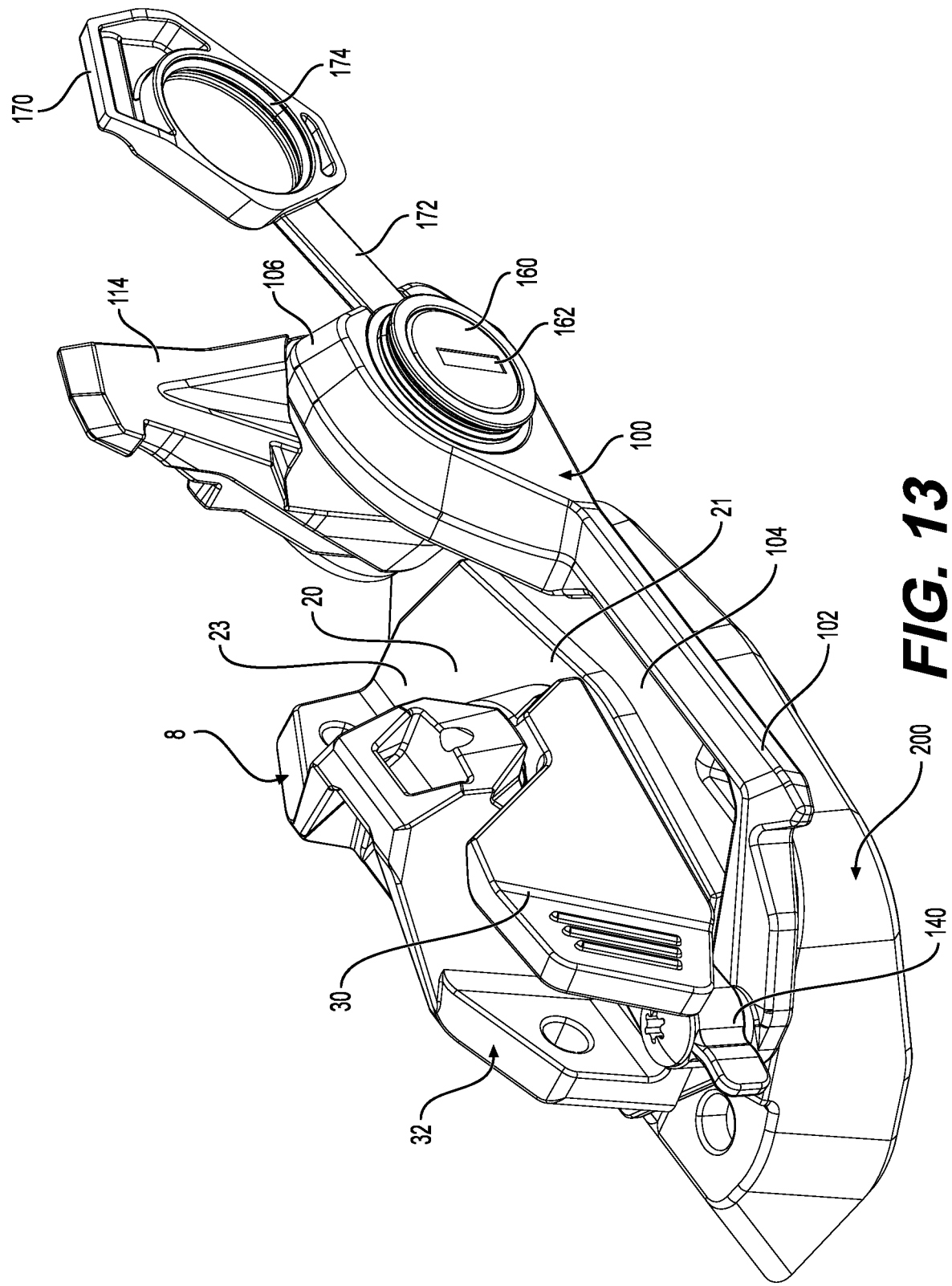
FIG. 13 is a perspective view, taken from a top, front, right side, of the anchoring system of FIG. 3, showing the anchor lever in a closed position and the lock lever of the locking device in the unlocked position.

Since in the unlocked position of the lock lever 114, the lock lever 114 permits free movement of the anchor lever 30 between the open and closed positions, as shown FIG. 13, the anchor lever 30 is then pivoted about the axis 26 to the closed position so as to place the fastener portion 22 in the fastened position. As explained previously, in the fastened position, the fastener portion 22 cannot be withdrawn from the chamber 232 of the anchor fixture 200. The lock body 102 is disposed between the anchor 8 and the anchor fixture 200 when the anchor 8 is fastened to the anchor fixture 200.

Figure 15:
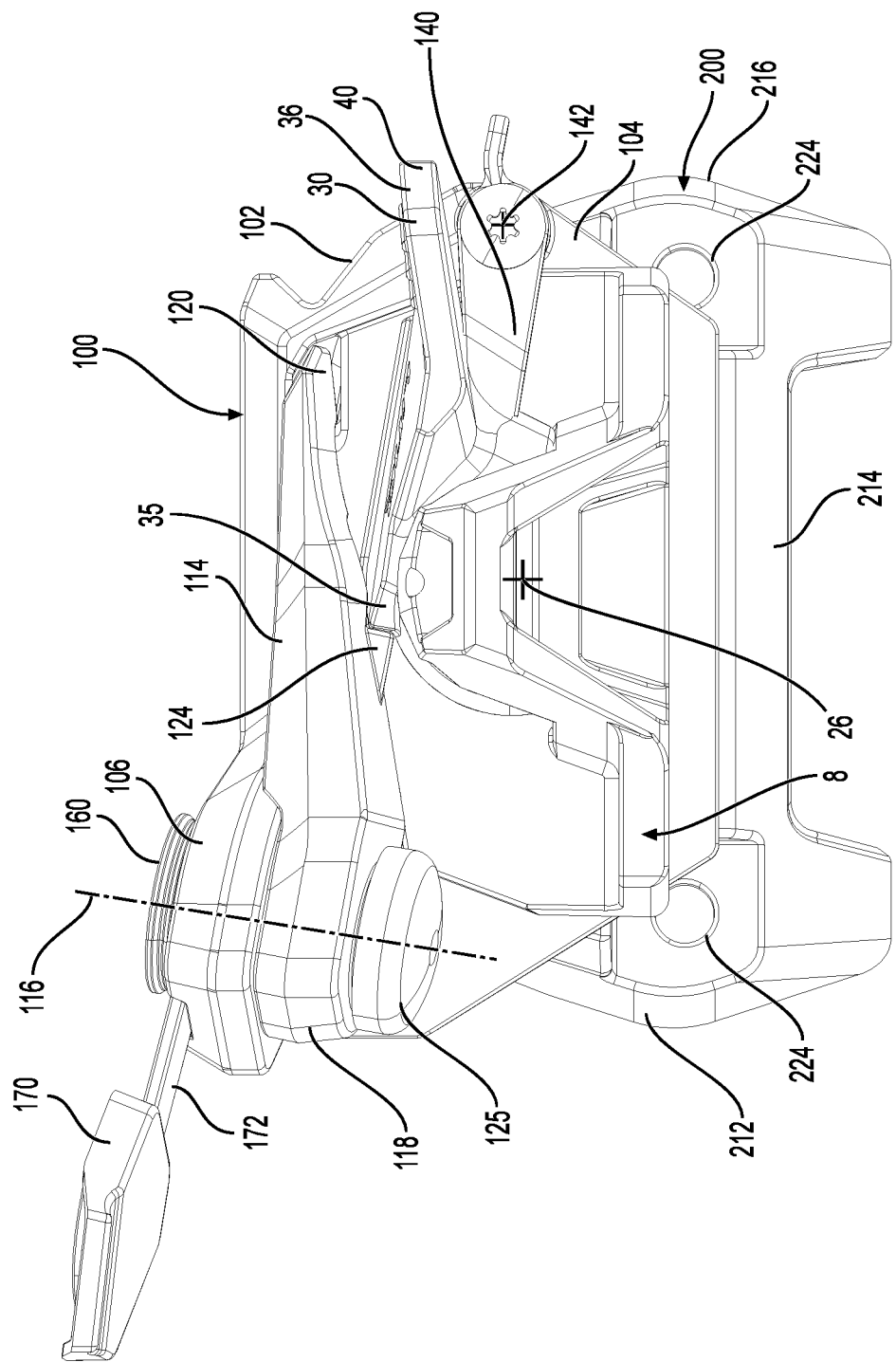
FIG. 15 is a top plan view of the anchoring system of FIG. 14.

As will be understood with reference to FIG. 11, when the anchor 8 is connected to the locking device 100, the axis 26 about which the anchor lever 30 pivots extends through the fastener aperture 112 of the lock body 102. Furthermore, as can be seen in FIG. 15, the axis 26 extends in a significantly different direction from the lock pivot axis 116. Notably, the axis 26 is generally perpendicular to the lock pivot axis 116. However, the axis 26 extends generally parallel to the retaining member pivot axis 142.

Figure 14:
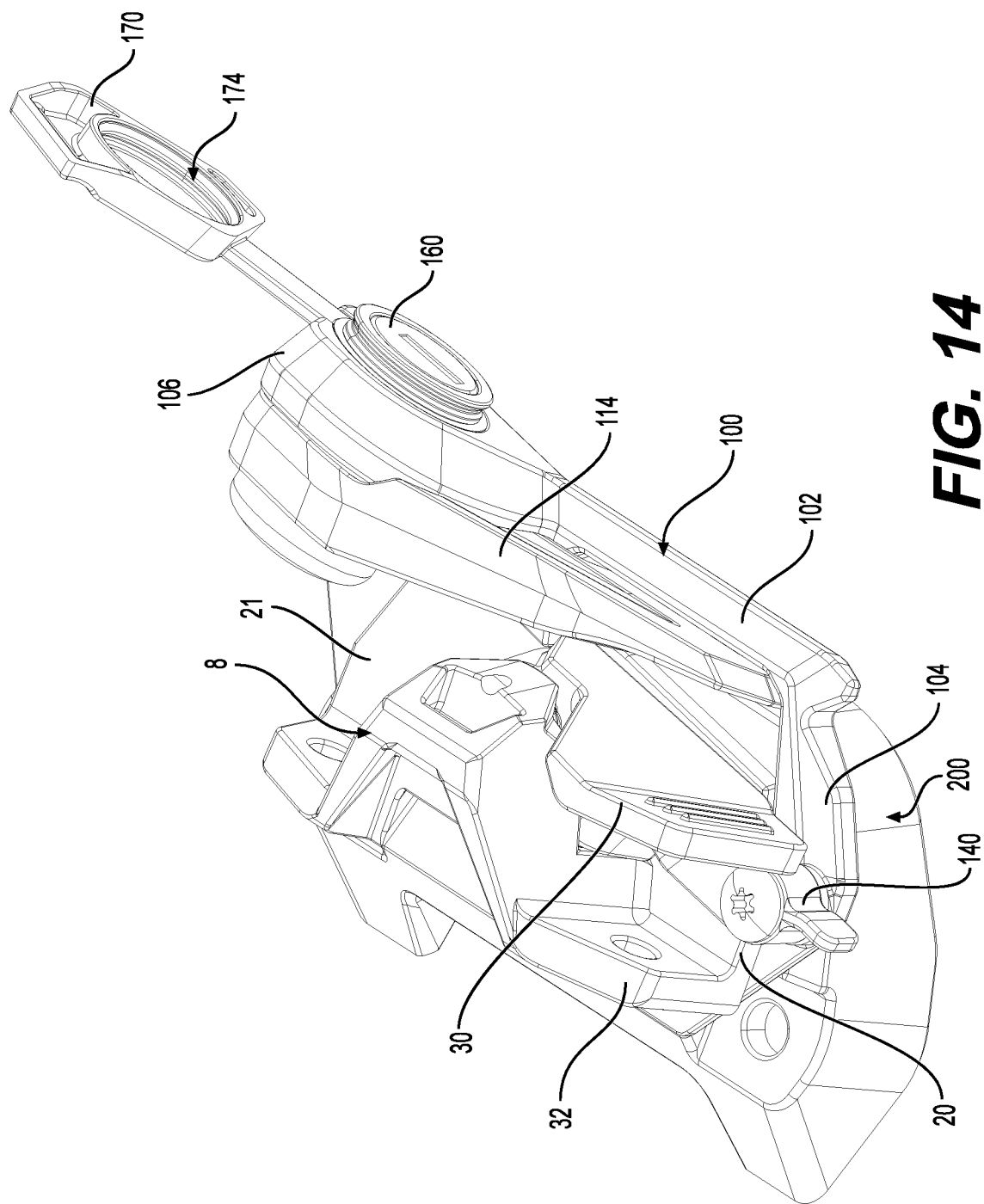
FIG. 14 is a perspective view, taken from a top, front, right side, of the anchoring system of FIG. 3, showing the lock lever of the locking device in the locked position.
Figure 16:
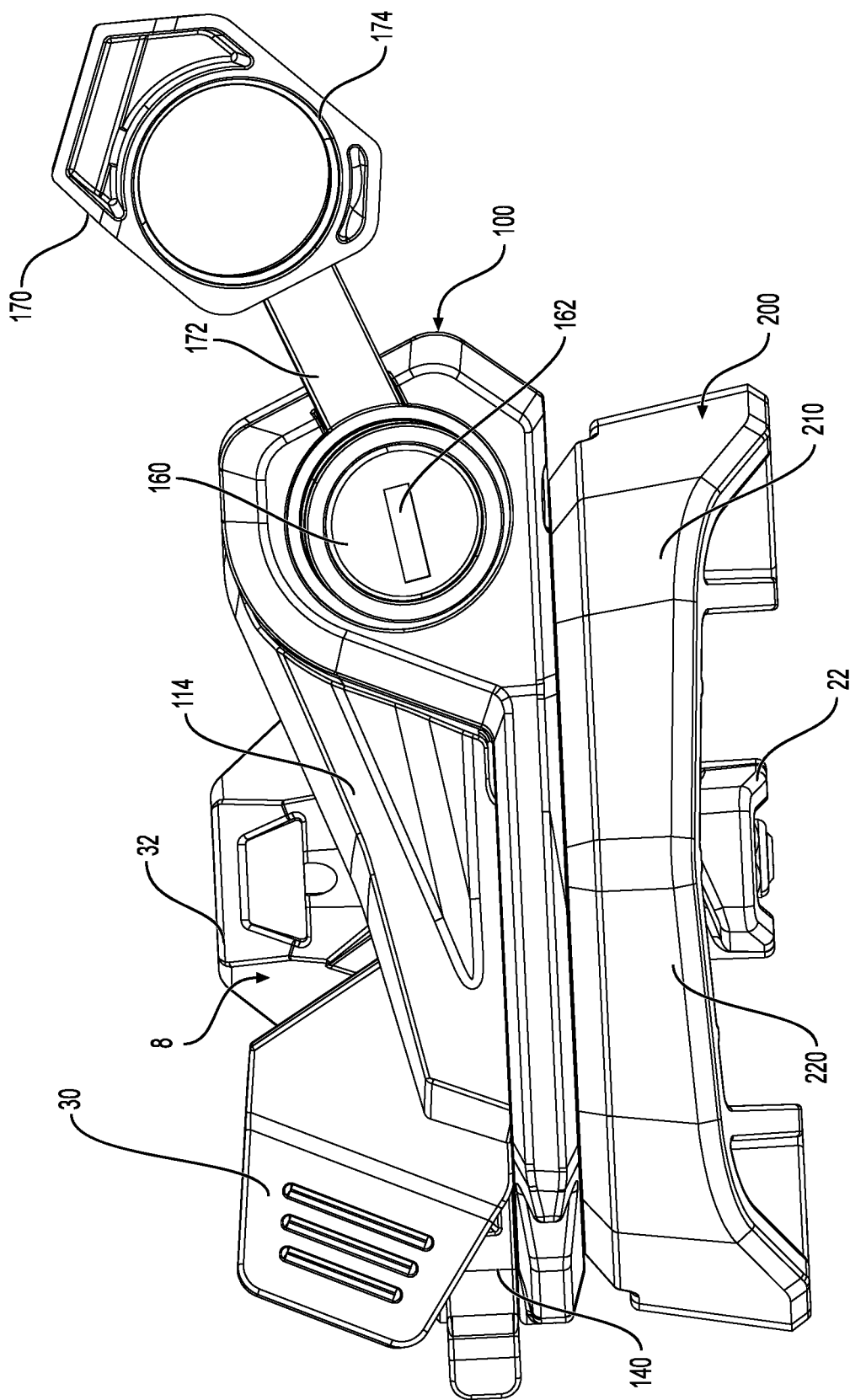
FIG. 16 is a front elevation view of the anchoring system of FIG. 14.

Next, with reference to FIGS. 14 to 16, the user inserts the key into the key aperture 162 of the key post 160 and rotates the key post 160 about the lock pivot axis 116 to the secured position which correspondingly pivots the lock lever 114 to the locked position. In its locked position, the lock lever 114 prevents the anchor lever 30 from being moved from the closed position to the open position. More particularly, in this embodiment, in its locked position, the lock lever 114 does not allow any movement of the anchor lever 30 from the closed position. That is, in addition to the lock lever 114 impeding movement of the anchor lever 30 from the closed position to the open position, when the lock lever 114 is in the locked position, the lock lever 114 prevents the anchor lever 30 from being moved from the closed position at all. Notably, as best seen in FIG. 15, in the locked position of the lock lever 114, the locking projection 124 abuts the base end 35 of the lever handle 36 so as to prevent the anchor lever 30 from being moved from the closed position. Furthermore, if someone were to try to pry open the lock lever 114 (i.e., from the locked position to the unlocked position) without having the key, sufficient force may cause part of the lock lever 114 to break, however due to the position of the locking projection 124 along the lock lever 114 (i.e., distanced from the tip 120), the remaining part of the lock lever 114 would likely include the locking projection 124 which would keep holding the anchor lever 30 in the closed position.

It is contemplated that the locking projection 124 could be omitted in other embodiments. In such embodiments, the lock lever 114 simply prevents the anchor lever 30 from being turned sufficiently as to cause the fastener portion 22 of the anchor 8 to allow the anchor 8 to disengage the anchor fixture 200.

As can be seen in FIG. 15, when the anchor lever 30 is in the closed position and the lock lever 114 is in the locked position, the anchor lever 30 and the lock lever 114 extend in a same direction from their respective pivot axes 26, 116. Moreover, when the anchor lever 30 is in the closed position and the lock lever 114 is in the locked position, the anchor lever 30 is disposed between the top portion 32 of the anchor base 20 and the lock lever 114.

To then remove the accessory 65 from the snowmobile 10, the user inserts the key into the key aperture 162 and rotates the key post 160 to the unsecured position which correspondingly causes the lock lever 114 to pivot to the unlocked position. The anchor lever 30 is then pivoted to the open position so as to pivot the fastener portion 22 to the unfastened position. The accessory 65 can then be removed from the snowmobile 10 simply by lifting the accessory 65 which causes the anchor 8 to disengage the anchor fixture 200, the anchor 8 being held together with the locking device 100 by the retaining member 140 (which is in the retaining position).

As will be understood from the above, the anchoring system 500 provides a secure and easy way to attach the accessory 65 to the snowmobile 10. Moreover, a system which includes only the anchor fixture 200 and the anchor 8 can be retrofitted with the locking device 100 to form the system 500 for security purposes. Furthermore, it is contemplated that the locking device 100 could be made integral with the anchor fixture 200 or the anchor 8.

Modifications and improvements to the above-described embodiments of the present may become apparent to those skilled in the art. The foregoing description is intended to be exemplary rather than limiting. The scope of the present is therefore intended to be limited solely by the scope of the appended claims.

What is claimed is:

1. A locking device for an anchor configured to connect an accessory to a vehicle, the anchor having an anchor lever pivotable from an open position to a closed position for opening and closing the anchor respectively, the locking device comprising:
    a lock body defining a fastener aperture configured to receive therethrough a fastener portion of the anchor, the fastener portion of the anchor being rotatable by moving the anchor lever between the open position and the closed position;
    a lock lever pivotably connected to the lock body, the lock lever being pivotable relative to the lock body between a locked position and an unlocked position, wherein, when the fastener portion of the anchor is received through the fastener aperture of the lock body:
       in the unlocked position, the lock lever permits free movement of the anchor lever between the open position and the closed position; and
       in the locked position, the lock lever prevents the anchor lever from being moved from the closed position to the open position;
    a key post movably connected to the lock body, the key post defining a key aperture for receiving a key, the key post being movable by the key from an unsecured position to a secured position, the lock lever being fixed in the locked position when the key post is in the secured position.

2. The locking device of claim 1, wherein:
    the key post is operatively connected to the lock lever;
    the lock lever is pivoted to the locked position by the key post when the key post is moved to the secured position; and
    the lock lever is pivoted to the unlocked position by the key post when the key post is moved to the unsecured position.

3. The locking device of claim 1, wherein the fastener aperture defined by the lock body has a generally pentagonal shape.

4. The locking device of claim 1, further comprising:
    a retaining member movably connected to the lock body, the retaining member being movable relative to the lock body between a retaining position and a free position, wherein:
       in the retaining position, the retaining member prevents the anchor from being disengaged from the locking device; and
       in the free position, the retaining member permits the anchor to be disengaged from the locking device.

5. The locking device of claim 4, wherein the retaining member is pivotably connected to the lock body, the retaining member being pivotable between the retaining position and the free position.

6. The locking device of claim 5, wherein:
    the lock lever is pivotable about a first pivot axis;
    the retaining member is pivotable about a second pivot axis; and
    the first pivot axis is generally perpendicular to the second pivot axis.

7. The locking device of claim 1, wherein the lock body comprises:
    a first portion defining the fastener aperture, the first portion being generally planar; and
    a second portion extending generally perpendicular to the first portion, the lock lever being pivotably connected to the second portion about an axis extending generally parallel to the first portion.

8. The locking device of claim 7, wherein:
    the first portion of the lock body defines a lever aperture;
    the lock lever has a base and a tip opposite the base, the base being pivotably connected to the lock body; and
    the lock lever is shaped such that a portion thereof is received in the lever aperture of the first portion of the lock body when the lock lever is in the locked position.

9. The locking device of claim 1, wherein:
    the lock lever has an inner surface and an outer surface opposite the inner surface, the inner surface facing toward the fastener aperture when the lock lever is in the locked position; and
    the lock lever comprises a locking projection extending from the inner surface, the locking projection being configured to abut a portion of the anchor lever of the anchor when the anchor lever is in the closed position so as to prevent the anchor lever from being moved from the closed position.

10. The locking device of claim 1, wherein:
    the lock lever is pivotable about a first pivot axis;
    the anchor lever is pivotable about a second pivot axis; and
    the first pivot axis is configured to be generally perpendicular to the second pivot axis.

11. An anchor assembly for use with an anchor fixture, the anchor assembly comprising:
    an anchor base;
    a fastener portion pivotably connected to the anchor base and spaced therefrom, the fastener portion being pivotable relative to the anchor base between an unfastened position and a fastened position, the fastener portion being configured to be inserted into an aperture defined by the anchor fixture;
    an anchor lever pivotably connected to the anchor base, the anchor lever being operatively connected to the fastener portion, the anchor lever being pivotable between an open position and a closed position for pivoting the fastener portion between the unfastened and fastened positions respectively;
    a lock body connected to the anchor base;
    a lock lever pivotably connected to the lock body, the lock lever being pivotable relative to the lock body between a locked position and an unlocked position, wherein:
       in the unlocked position, the lock lever permits free movement of the anchor lever between the open position and the closed position; and
       in the locked position, the lock lever prevents the anchor lever from being moved from the closed position to the open position; and
    a key post movably connected to the lock body, the key post defining a key aperture for receiving a key, the key post being movable by the key from an unsecured position to a secured position, the lock lever being fixed in the locked position when the key post is in the secured position.

12. The anchor assembly of claim 11, wherein the lock body defines a fastener aperture configured to receive therethrough the fastener portion of the anchor.

13. The anchor assembly of claim 12, wherein the lock body comprises:
   a first portion defining the fastener aperture, the first portion being generally planar; and
   a second portion extending generally perpendicular to the first portion, the lock lever being pivotably connected to the second portion about an axis extending generally parallel to the first portion.

14. The anchor assembly of claim 12, wherein:
   the lock lever has an inner surface and an outer surface opposite the inner surface, the inner surface facing toward the fastener aperture when the lock lever is in the locked position; and
   the lock lever comprises a locking projection extending from the inner surface, the locking projection abutting a portion of the anchor lever of the anchor when the anchor lever is in the closed position so as to prevent the anchor lever from being moved from the closed position.

15. The anchor assembly of claim 14, wherein:
   the anchor lever comprises a lever base and a lever handle extending from the lever base, the lever handle being configured to be operated by a user to pivot the anchor lever;
   the lever handle has a first end and a second end, the first end being nearer to the lever base than the second end; and
   when the anchor lever is in the closed position and the lock lever is in the locked position, the locking projection of the lock lever abuts the first end of the anchor lever so as to prevent the anchor lever from being moved from the closed position.

16. The anchor assembly of claim 11, wherein:
   the lock lever is pivotable about a first pivot axis;
   the anchor lever is pivotable about a second pivot axis; and
   the first pivot axis is generally perpendicular to the second pivot axis.

17. The anchor assembly of claim 12, wherein the anchor lever is pivotable about an axis that extends through the fastener aperture of the lock body.

18. The anchor assembly of claim 11, wherein, when the anchor lever is in the closed position and the lock lever is in the locked position, the anchor lever and the lock lever extend in a same direction from their respective pivot axes.

19. The anchor assembly of claim 11, wherein, when the anchor lever is in the closed position and the lock lever is in the locked position, the anchor lever is disposed between the anchor base and the lock lever.

20. A system for securing an accessory to a vehicle, comprising:

an anchor fixture configured to be connected to the vehicle, the anchor fixture having a fixture body defining an anchor aperture;

an anchor configured to be connected to an accessory, the anchor being fastenable to the anchor fixture, the anchor comprising:
   an anchor base;
   a fastener portion pivotably connected to the anchor base and spaced therefrom, the fastener portion being insertable through the fastener aperture of the anchor fixture, the fastener portion being pivotable relative to the anchor base between an unfastened position and a fastened position,
      in the unfastened position, when the fastener portion has been inserted through the fastener aperture of the anchor fixture, the fastener portion being oriented to be removed through the fastener aperture of the anchor fixture; and
      in the fastened position, when the fastener portion has been inserted through the fastener aperture of the anchor fixture, the fastener portion being oriented to prevent its removal through the fastener aperture of the anchor fixture; and
   an anchor lever pivotably connected to the anchor base, the anchor lever being operatively connected to the fastener portion of the anchor, the anchor lever being pivotable between an open position and a closed position for pivoting the fastener portion between the unfastened and fastened positions respectively;

a locking device for locking the anchor to the anchor fixture, the locking device comprising:
   a lock body being disposed at least partly between the anchor and the anchor fixture when the anchor is fastened to the anchor fixture, the lock body defining a fastener aperture for receiving therethrough the fastener portion of the anchor, the fastener aperture of the locking device being generally aligned with the fastener aperture of the anchor fixture when the system is in use;
   a lock lever pivotably connected to the lock body, the lock lever being pivotable relative to the lock body between a locked position and an unlocked position, wherein, when the fastener portion of the anchor is received through the fastener aperture of the lock body:
      in the unlocked position, the lock lever permits free movement of the anchor lever between the open position and the closed position; and
      in the locked position, the lock lever prevents the anchor lever from being moved from the closed position to the open position; and
   a key post movably connected to the lock body, the key post defining a key aperture for receiving a key, the key post being movable by the key from an unsecured position to a secured position, the lock lever being fixed in the locked position when the key post is in the secured position.

* * * * *